United States Patent
Dedhia et al.

(10) Patent No.: US 9,727,776 B2
(45) Date of Patent: Aug. 8, 2017

(54) OBJECT ORIENTATION ESTIMATION

(71) Applicant: Microsoft Corporation, Redmond, WA (US)

(72) Inventors: Bhaven P. Dedhia, Redmond, WA (US); Yaron Eshet, Seattle, WA (US); Geoffrey J. Hulten, Lynnwood, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 305 days.

(21) Appl. No.: 14/288,287

(22) Filed: May 27, 2014

(65) Prior Publication Data

US 2015/0348269 A1 Dec. 3, 2015

(51) Int. Cl.
*G06K 9/00* (2006.01)
*G06T 7/73* (2017.01)

(52) U.S. Cl.
CPC ............ *G06K 9/00268* (2013.01); *G06T 7/75* (2017.01); *G06T 2207/10024* (2013.01); *G06T 2207/10028* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 6,064,749 A * | 5/2000 | Hirota | G06F 3/011 345/7 |
| 6,301,370 B1 | 10/2001 | Steffens et al. | |
| 6,580,821 B1 * | 6/2003 | Roy | G06K 9/00288 382/118 |
| 6,741,756 B1 * | 5/2004 | Toyama | G06T 7/75 382/159 |
| 8,254,647 B1 * | 8/2012 | Nechyba | G06K 9/00248 382/118 |
| 8,390,619 B1 | 3/2013 | Voorhies et al. | |
| 8,396,263 B2 * | 3/2013 | Li | G06K 9/00228 382/118 |
| 8,437,537 B2 * | 5/2013 | Chang | G06K 9/00208 345/419 |
| 8,597,142 B2 | 12/2013 | Mayles et al. | |
| 9,279,661 B2 * | 3/2016 | Tateno | G01B 11/002 |
| 9,519,971 B2 * | 12/2016 | Kotake | G06T 7/0046 |
| 2001/0033685 A1 * | 10/2001 | Ishiyama | G06K 9/00221 382/154 |
| 2004/0258313 A1 * | 12/2004 | Jones | G06K 9/00228 382/224 |

(Continued)

OTHER PUBLICATIONS

Accurate Shape-based 6-DoF-objects, Azad et al., IEEE, 978-1-4244-3804-4, 2009, pp. 2690-2695.*

(Continued)

*Primary Examiner* — Jayesh A Patel
(74) *Attorney, Agent, or Firm* — Rainier Patent, P.S.

(57) ABSTRACT

The description relates to estimating object orientation. One example includes determining a first estimate of object orientation using a first technique and image data. In this example, a second estimate of the object orientation can be determined using a second technique and the image data. The first estimate can be corrected with the second estimate to generate a corrected object orientation estimate which can be output.

21 Claims, 16 Drawing Sheets

(56) References Cited

U.S. PATENT DOCUMENTS

| | | | |
|---|---|---|---|
| 2005/0190972 A1* | 9/2005 | Thomas | G06K 9/209 382/218 |
| 2008/0109397 A1* | 5/2008 | Sharma | G06Q 30/02 |
| 2008/0247611 A1* | 10/2008 | Aisaka | G06K 9/00261 382/118 |
| 2009/0232363 A1* | 9/2009 | Ohashi | G06K 9/00281 382/118 |
| 2009/0309878 A1* | 12/2009 | Otani | G06K 9/00208 345/427 |
| 2011/0052013 A1* | 3/2011 | Sasahara | G06K 9/00248 382/118 |
| 2012/0182294 A1* | 7/2012 | Cordon Garcia | G06T 17/00 345/419 |
| 2012/0288167 A1* | 11/2012 | Sun | G06K 9/00281 382/118 |
| 2013/0063556 A1 | 3/2013 | Russell et al. | |
| 2013/0201291 A1* | 8/2013 | Liu | G06F 3/012 348/47 |
| 2013/0251244 A1* | 9/2013 | Wei | G06K 9/00281 382/159 |
| 2014/0043329 A1 | 2/2014 | Wang et al. | |
| 2014/0355825 A1* | 12/2014 | Kim | G06T 7/0046 382/103 |
| 2015/0213617 A1* | 7/2015 | Kim | G06K 9/00798 382/103 |
| 2016/0148381 A1* | 5/2016 | Aoki | G06K 9/00255 382/103 |

OTHER PUBLICATIONS

Multi-task-depth images, Lallemand et al., IEEE, 978-0-7695-5067-1,2013, pp. 271-278.*

Yang et al., "Robust Face Tracking with a Consumer Depth Camera", In IEEE International Conference on Image Processing, Sep. 30, 2012, 4 pages.

Bellmore, Colin, "Facial Feature Point Fitting with Combined Color and Depth Information for Interactive Displays", In Doctoral Dissertation, Jan. 11, 2012, 106 pages.

Pantic et al., "Dynamics of Facial Expression: Recognition of Facial Actions and Their Temporal Segments from Face Profile Image Sequences", In IEEE transactions on Systems, Man, and Cybernetics, Part B: Cybernetics, vol. 36, Issue 2, Apr. 2006, pp. 433-449.

* cited by examiner

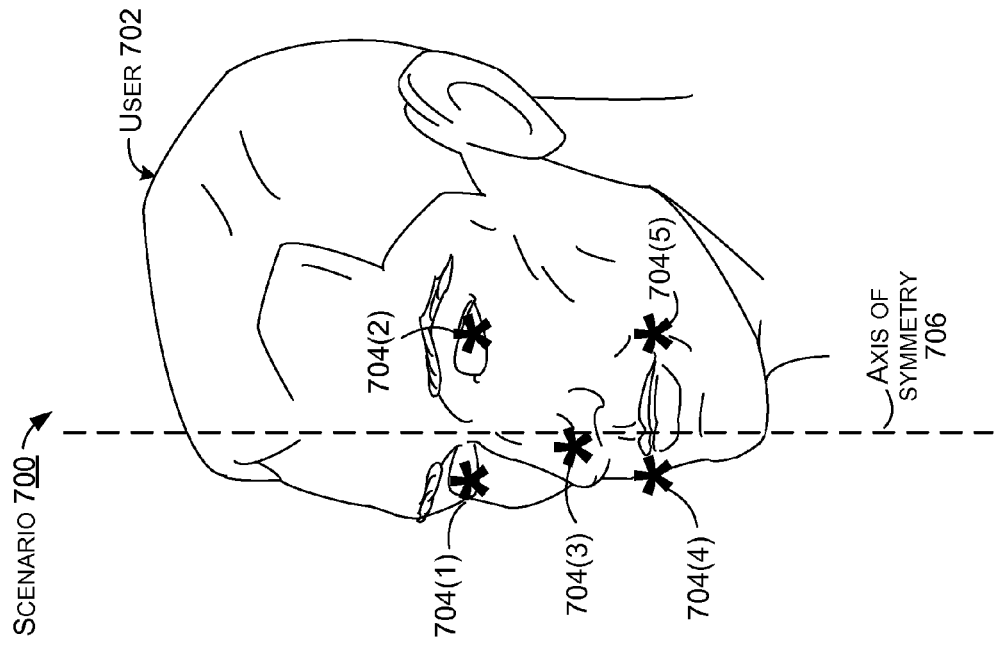
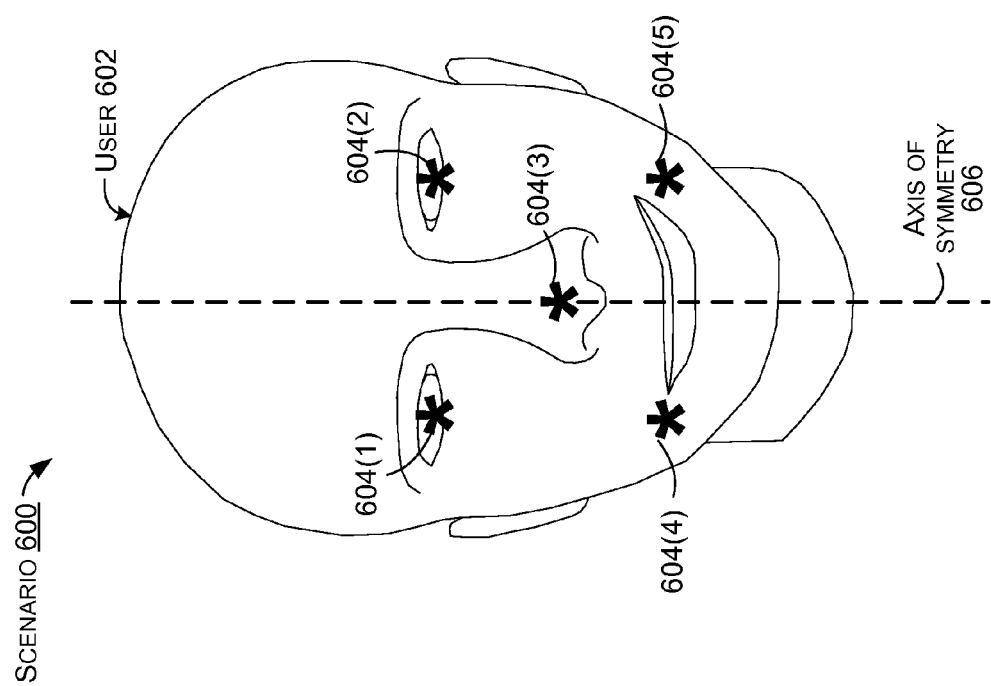

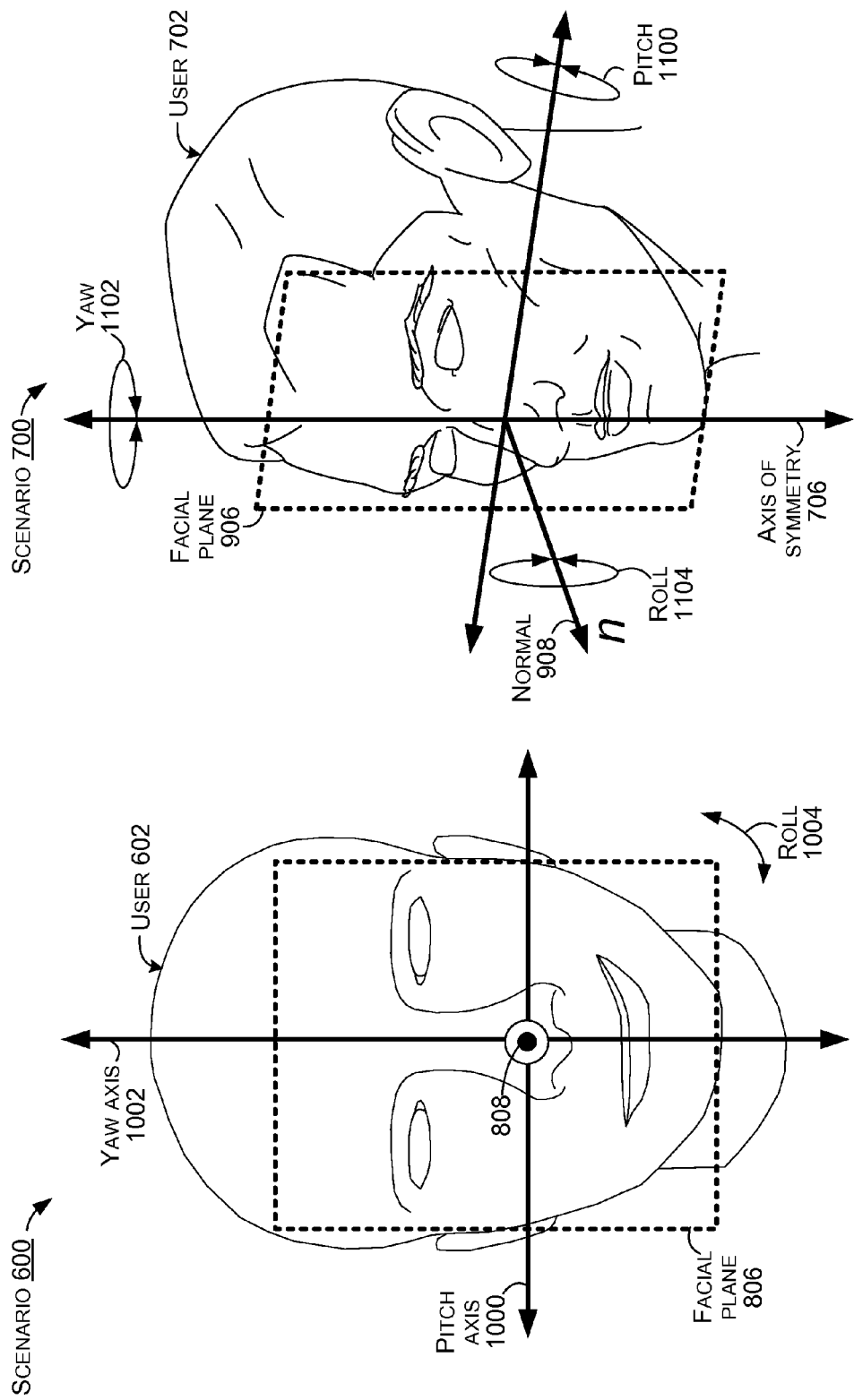

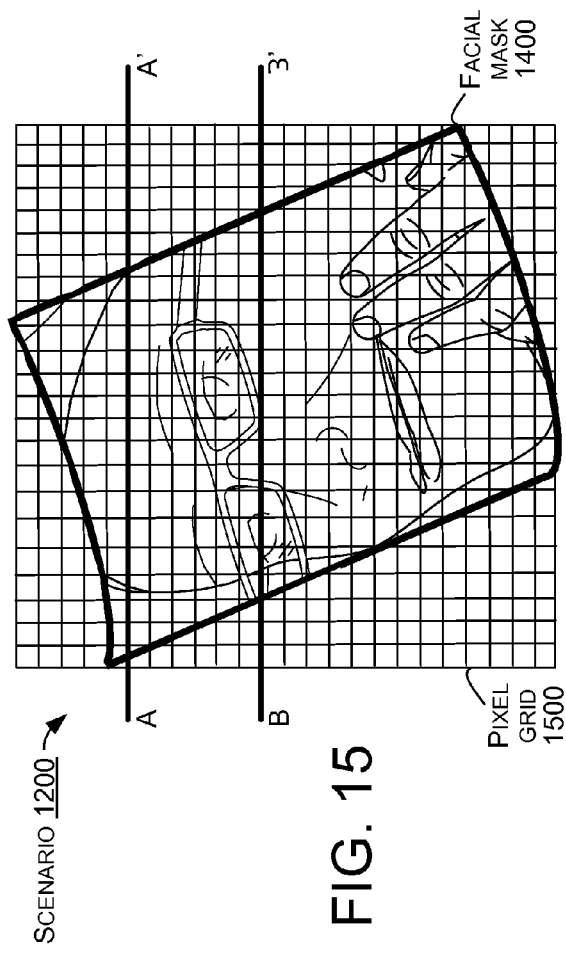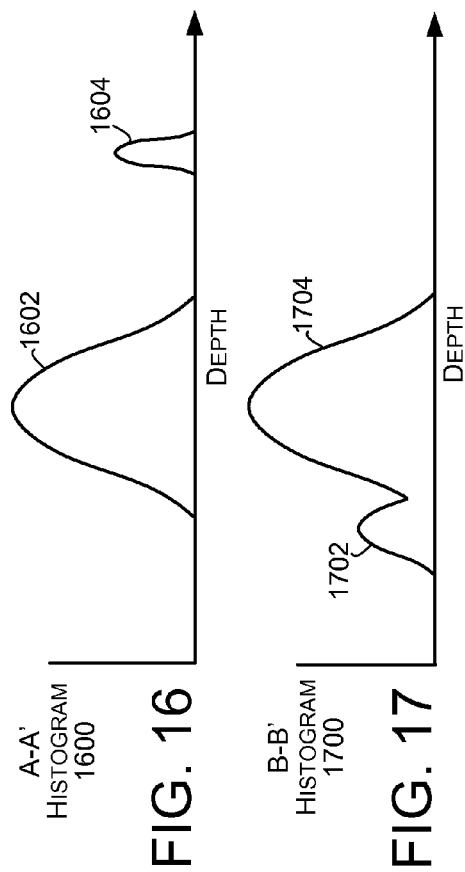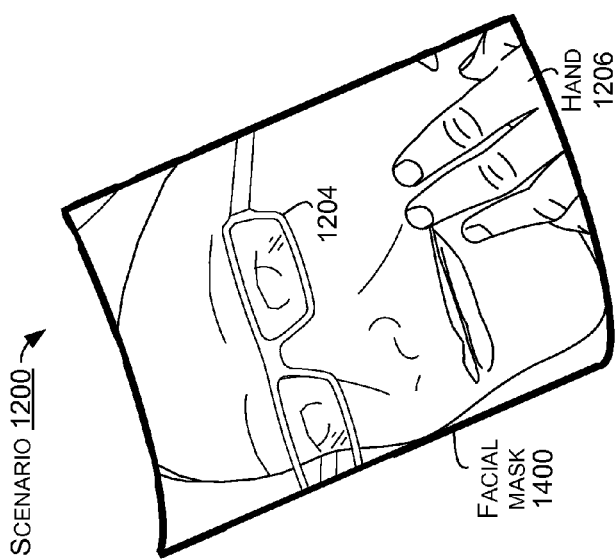
FIG. 15
FIG. 16
FIG. 17
FIG. 14

OBJECT ORIENTATION ESTIMATION

BACKGROUND

Estimating object orientation can be useful in various computing scenarios. For example, the object can be a user's head, in which case orientation of the user's head can be useful for indicating intent of the user while interacting with a computer. For example, estimating head orientation can help translate a command from a user, such as by indicating a video game object that the user is directing the command toward in the video game.

Depth information can be an important data source for high quality estimations of object orientation. However, object orientation estimates using depth information can be affected by suboptimal environmental and/or operating conditions. Examples of suboptimal conditions can include the distance of the object from a sensor, low available image resolution, varying light conditions, artifacts from sensor noise and/or depth multi-path effects, and/or occlusions, such as a hand in front of a face. Also, constraints can include a computational resource budget such that certain approaches are impractical, including frame-to-frame tracking and/or a pre-calibration step. All of these constraints may be concurrently present. For example, a video game may involve input from several players participating simultaneously, at different distances from a camera, and demanding real-time head orientation estimates.

SUMMARY

The description relates to estimating object orientation. One example includes determining a first estimate of object orientation using a first technique and image data. In this example, a second estimate of the object orientation can be determined using a second technique and the image data. The first estimate can be corrected with the second estimate to generate a corrected object orientation estimate which can be output.

The above listed example is intended to provide a quick reference to aid the reader and is not intended to define the scope of the concepts described herein.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. In some cases parentheticals are utilized after a reference number to distinguish like elements. Use of the reference number without the associated parenthetical is generic to the element. Further, the left-most numeral of each reference number conveys the FIG. and associated discussion where the reference number is first introduced.

FIGS. 2-4, 6-19, 21-22, and 24 illustrate example object orientation estimation scenarios consistent with some implementations of the present concepts.

DETAILED DESCRIPTION

Overview

Figure 1:
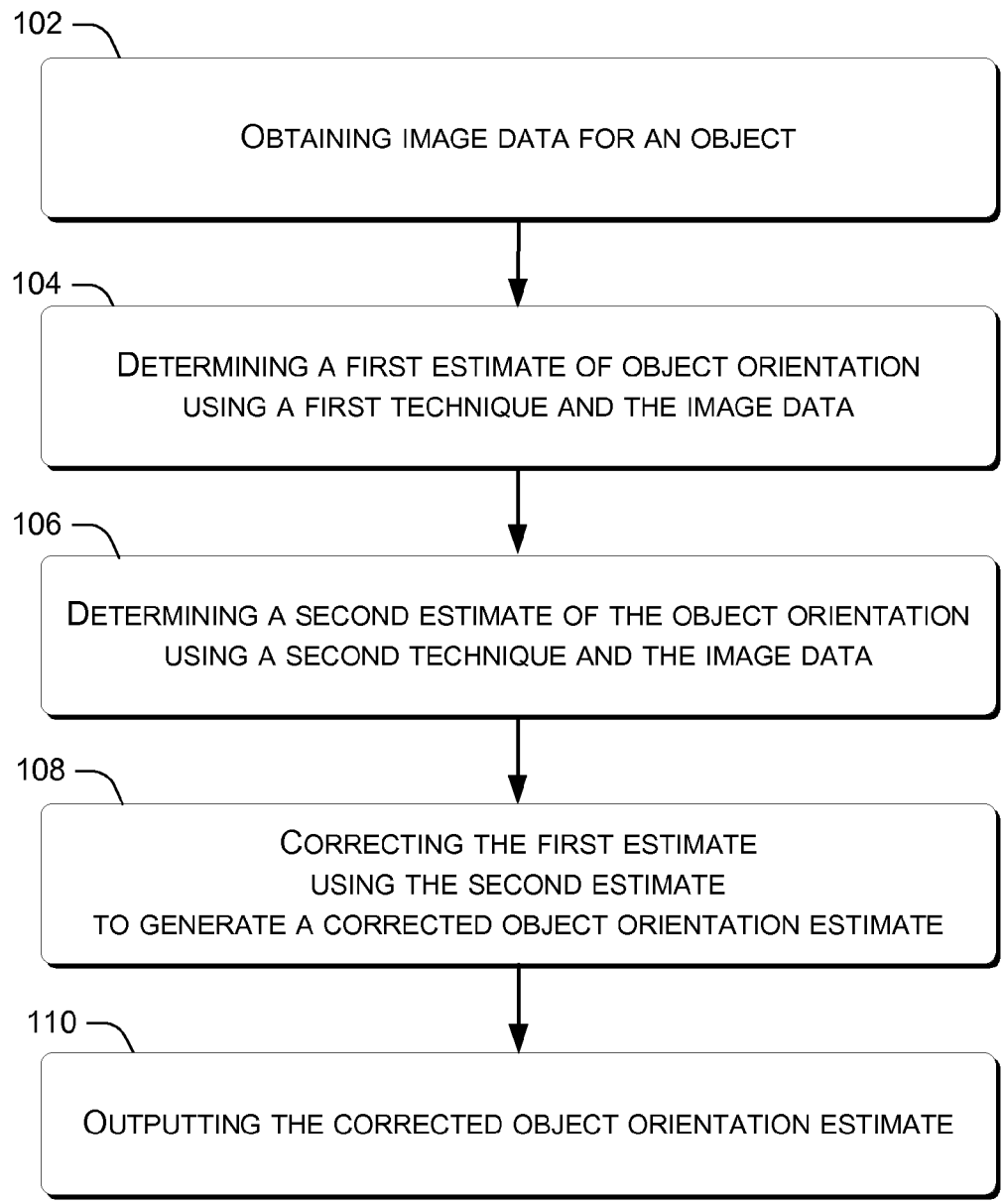
FIGS. 1, 5, 20, and 23 illustrate example techniques consistent with some implementations of the present concepts.

This description relates to techniques for estimating object orientation and/or pose. Generally, the following discussion uses the term orientation with respect to various rotations of objects discussed herein. However, the disclosed implementations may also be used while accounting for object translations and thus may be more generally used to determine object pose. Initially, the discussion provides several scenarios in which the object is the head of a user. However, note that the disclosed techniques can also be performed for various other types of physical objects.

In the case where the object is a head, the head pose can include a location of the head and/or face of a user in three-dimensional (3D) space with respect to a sensor, as well as which way the face is pointing. An estimate of head pose of the user can include an estimate of position of the head relative to a sensor origin point (e.g., based on translation) and estimates of angles of rotation of the head relative to one or more axes of rotation (e.g., relative to a coordinate system of a sensor).

For example, the angles of rotation of a given object can include yaw, pitch, and roll. In one implementation, a first estimate of object orientation can be made by a first technique that can use depth data (e.g., 3D information, 3D data) and can also use two-dimensional image data (e.g., 2D data). A second estimate of at least one of the angles of rotation of the object can be made by a second technique utilizing 2D data. For example, the second technique can be used to make a second estimate of object orientation. The first and second estimates can, in some cases, include corresponding first and second estimates of a yaw angle. Furthermore, in some implementations, the second estimate can be used to provide a confidence measure, detect outliers, and/or correct the first estimate of head orientation.

In general, the head orientation of the user can change with respect to the body of the user as the user turns their head left or right (e.g., yaw), looks up or down (e.g., pitch), or rotates their head at an angle (e.g., roll), for example. The head orientation can also change as the user moves their whole body, including their head. From the perspective of a sensor, the head orientation may also change as the user moves relative to the sensor.

Estimating head orientation as a user input can be useful in many computer interaction contexts and applications, such as interactive video games, educational applications, etc. For example, head orientation can help face recognition and/or eye gaze estimation. Head orientation can be used to determine whether a user is engaged in an interaction or with an application, or is perhaps otherwise engaged.

Estimating object orientation may be difficult when presented with multiple environmental or operational constraints at once, and/or may be computationally demanding. For example, object orientation estimation approaches using time-of-flight (TOF) depth data can yield high quality results at relatively short distances from the TOF camera to the user. However, as the object gets further away from the camera more noise can be introduced and fine features, such as a nose, can become difficult to detect. In another example, depth information for an object close to a wall can include distortions due to multi-path effects. In other cases, computational constraints can motivate an efficient computational approach, such as a time limit on a total processing pipeline per head orientation estimate. However, frame-to-frame tracking with TOF depth data can consume significant time per object orientation estimate. Approaches including pre-calibration steps and/or machine learning methods can also consume significant processing resources to perform orientation estimates.

To summarize, in some implementations, combining two object orientation estimation techniques can yield a corrected object orientation estimation. In some cases, correcting a first object orientation estimate by a second technique can be useful, such as when challenged with difficult environmental and operational constraints. In particular, combining a first technique and a second technique can provide an improved object orientation estimate in situations where the first technique relies on depth data that are less reliable. Furthermore, combining two techniques can account for inaccuracies in the first technique while also being computationally efficient.

Overall Correction Technique

FIG. 1 shows an example method 100 consistent with the present concepts. In this example, method 100 includes determining a first estimate of object orientation with a first technique and determining a second estimate of the object orientation with a second technique, and correcting the first estimate of the object orientation with the second estimate of the object orientation.

In this case, the method 100 can obtain image data for an object at block 102. In some implementations, sensors can be used to collect both depth data and 2D data to use as the image data for estimating object orientation.

At block 104, the method 100 can determine a first estimate of object orientation using a first technique and the image data. In one implementation, the collected depth and 2D data can be analyzed to determine a portion of the image that represents a mask of the object. A first estimate of object orientation can be determined from the mask, as discussed more below. In cases where the object is a human head, the mask can be a facial mask.

At block 106, the method can determine a second estimate of the object orientation using the second technique and the image data. In this case, the 2D data can be analyzed to determine particular landmarks of the object. A second estimate of object orientation can be determined using the landmarks, as discussed more below. In cases where the object is a human head, the landmarks can be facial landmarks.

At block 108, the method can correct the first estimate using the second estimate to generate a corrected object orientation estimate. In some cases, the first estimate from depth data and the second estimate can be compared to determine an extent to which the first estimate is consistent with the second estimate.

At block 110, the method can output the corrected object orientation estimate. Additionally or alternatively, the method can store and/or combine a succession of object orientation estimates. For example, in cases where the object is a human head, the method can interpret user intent from a succession of head orientation estimates corresponding to the user shaking their head and causing corresponding changes in pitch or yaw, perhaps indicating a yes or no response.

Note that the 2D data used with the first and second techniques can be the same 2D data, e.g., IR data from an IR sensor also used to capture the depth data. Alternatively, the first and second techniques can use different sources of 2D data, e.g., IR for the first technique and red-green-blue (RGB) for the second technique or vice versa. In cases where different sensors are used to capture various 2D or 3D image data as discussed herein, the different sensors can be registered to account for differences in the locations of the sensors when performing the techniques discussed below.

Specific Object Orientation Estimation Scenarios

Figure 2:
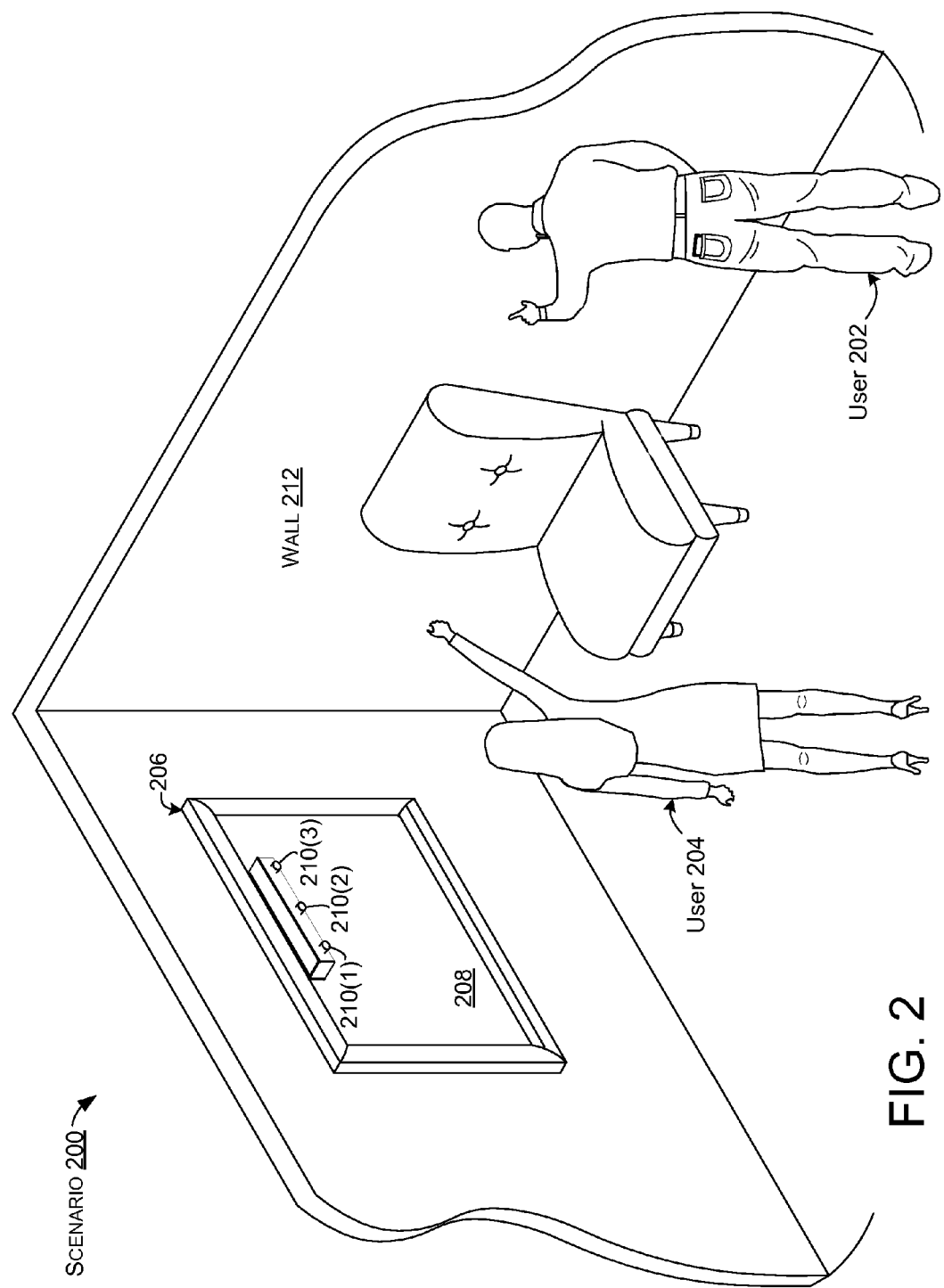
Figure 4:
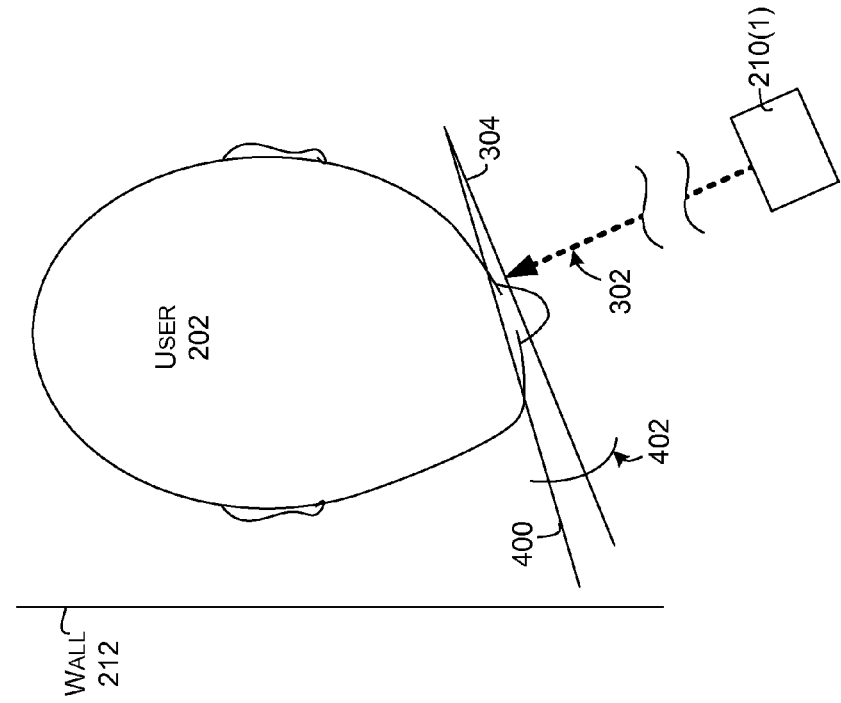
Figure 3:
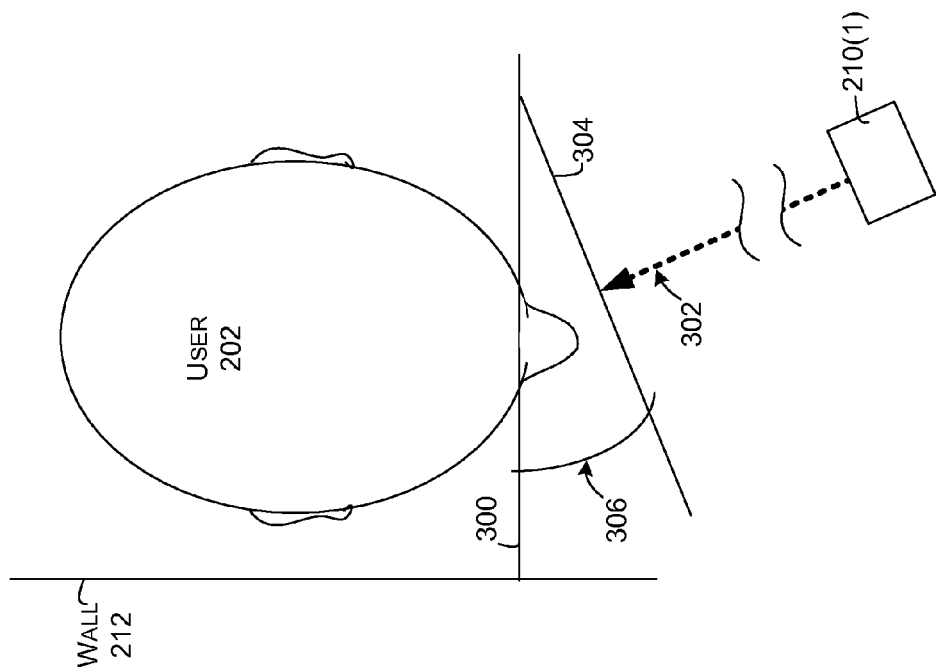

FIGS. 2 through 4 collectively illustrate an example object orientation estimation scenario 200 which is consistent with the present concepts. In the following specific examples, the object is a user's head.

In this example shown in FIG. 2, users 202 and 204 can be interacting with a head orientation estimation system 206. System 206 can include computer display 208 and sensors 210. The system 206 can be associated with a video game, for example. As the users move they will naturally progress through a variety of head orientations relative to the computer display, the one or more sensors, the walls of the room, and objects in the room, including each other. FIG. 2 illustrates an instance in which user 202 is in close proximity to a wall 212. In this case, system 206 may estimate the head orientation of user 202. However, the proximity of user 202 to the wall may lead to artifacts in the corresponding depth data for user 202 collected by sensors 210. Therefore, in this case, the head orientation estimate may benefit from correction.

In scenario 200, sensors 210 can be detecting information related to users 202 and 204. As noted above, sensors 210 can be a single or multiple sensors, cameras, and/or video cameras for detecting depth and/or 2D data. In some implementations, at least one sensor can collect depth data, such as sensor 210(1), and at least one other sensor can collect 2D data, such as sensor 210(2) or 210(3). In some cases, a single camera can include multiple types of sensors. Examples of sensors that can collect depth data include, but are not limited to, infrared (IR) depth camera systems, TOF depth cameras, structured light cameras, and stereo camera systems. Examples of sensors that collect 2D data include, but are not limited to, cameras or video cameras that record color image data such as RGB image data and/or monochrome image data such as IR image data. For purposes of this example, sensor 210(1) will be described as a TOF depth camera that collects both depth data and 2D IR image data.

FIGS. 3 and 4 illustrate a situation in which head orientation estimates from depth data can tend to be unreliable. FIG. 3 illustrates a view looking down on user 202, showing the proximity of user 202 to the wall 212. In this example, the direction user 202 is facing is generally at an angle to sensor 210(1), a TOF depth camera. In this case, line 300 is parallel to the face of the user. Arrow 302 represents the line-of-sight of the TOF depth camera. Line 304 is perpendicular to arrow 302. Together, lines 300 and 304 describe a true yaw angle 306 of the head of the user with respect to the TOF depth camera. In this example, the true yaw angle 306 of the head of the user can be around 30 degrees. However, data collected by the TOF depth camera can include distortions, such as multi-path effects, which can affect an observed yaw angle.

For example, a TOF depth system can send IR pulses out and receive return infrared (IR) pulses from objects in its view field. Accordingly, sensor 210(1) can receive return IR pulses from the face of user 202, but also from wall 212. The multiple returned IR pulses can produce a distorted image of the face of user 202, as shown in FIG. 4. In FIG. 4, line 304 is still perpendicular to arrow 302, the line-of-sight of sensor 210(1). However, in this example, the side of the face of user 202 that is closer to the wall appears further forward (e.g., closer to sensor 210(1)). The distortion of the face can create an illusion that the face is turned to one side, such that line 400 is parallel to the distorted face. The distortion can lead to observation of a false yaw angle 402, described by lines 400 and 304. In this example, the false yaw angle 402 can be around 7 degrees. The false yaw angle can contribute to a poor quality head orientation estimate. In some implementations, an acceptable yaw angle estimate error between the true yaw angle and the false yaw angle can be five degrees or less to produce an acceptable quality head orientation estimate.

In some cases, yaw can be more susceptible to inaccuracies related to depth data than either pitch or roll estimates. For example, in the case of the user 202 being close to the wall 212 as shown in FIGS. 2 through 4, multi-path effects may lead to an erroneous yaw angle estimate using depth data, but estimates of pitch or roll angles may not be significantly affected. Therefore, in some implementations, a second technique that does not rely on depth data may be used to check the yaw angle estimate. In other cases, yaw, pitch, and/or roll estimates may be checked with a second technique.

Other situations can produce problematic rotation angle estimates from depth data. For example, the available depth data may have low resolution, such as when the user is relatively far from the camera, or when the user is a child and may have smaller and/or finer facial features. Rotation angle estimates can be problematic for approaches relying on depth data alone when the user is in a near-profile orientation with respect to the depth camera. Therefore, checking rotation angle estimates with a second technique that does not rely on depth data can be helpful in a variety of situations.

Example of First Technique for Estimating Object Orientation

Figure 5:
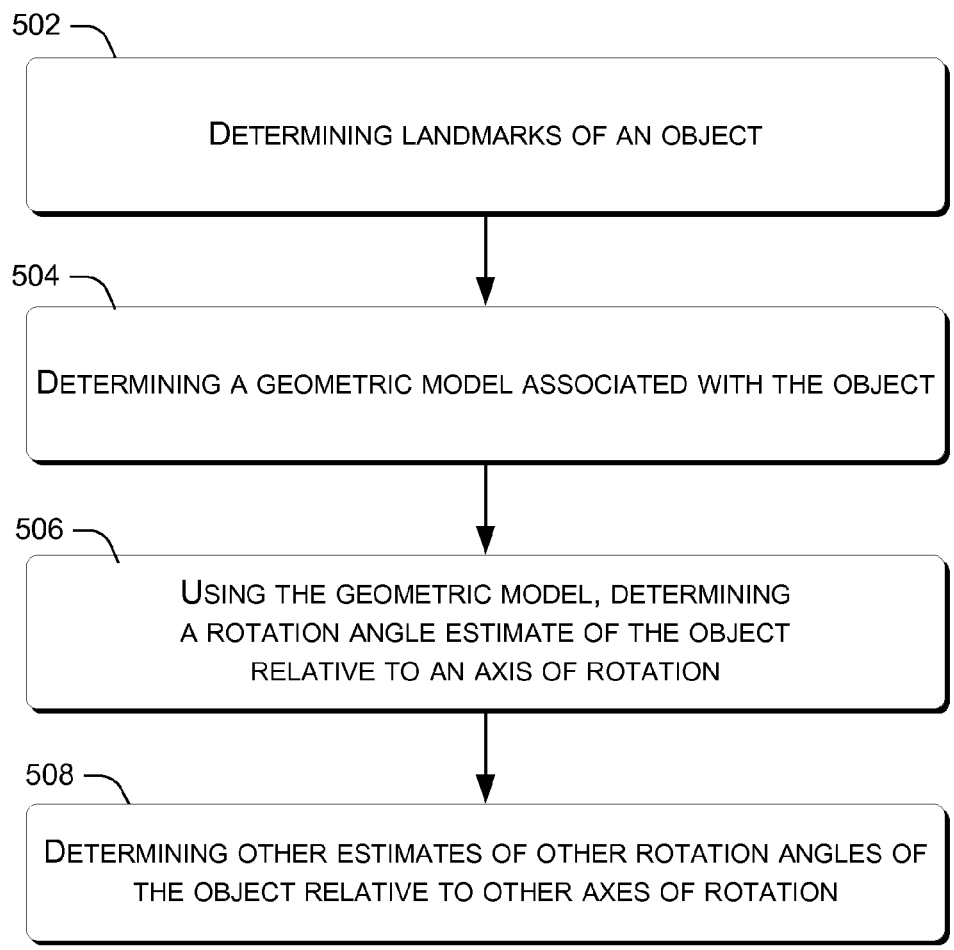

FIG. 5 shows an example method 500 consistent with the present concepts. Method 500 can represent a first object orientation estimation technique. In some cases, method 500 can perform block 104 of method 100 (see FIG. 1).

At block 502, method 500 can determine landmarks of an object. In some cases, the method can include differentiation of the object from other portions of the image data. For example, in cases where the object is a user's head, block 502 can include differentiating part/all of a face from the head of the user. Note that the face of the user can, in some cases, be detected without first detecting the body or head of the user.

At block 504, method 500 can determine a geometric model associated with the object. In the case where the object is a user's head, the geometric model can be a plane (e.g., facial plane). In this case, the facial plane can be determined as an area corresponding to facial landmarks. More generally, the geometric model can be relatively less accurate than a complete or more thorough model, but provide robustness to noise and perform over a wide range of distances while meeting various computational constraints.

At block 506, using the geometric model, method 500 can determine a rotation angle estimate of the object relative to an axis of rotation. For example, in some specific cases, the rotation angle estimate can be a yaw estimate.

At block 508, the method can determine other estimates of other rotation angles of the object relative to other axes of rotation. In some cases, the other rotation angle estimates can be made using the same technique. For example, in some cases, the other rotation angle estimates can be pitch and roll estimates. The method can determine the pitch and roll estimates using the determined geometric model and/or landmarks.

The first technique will now be described in more detail relative to FIGS. 6 through 19. FIGS. 6 through 19 illustrate the first technique as performed in the case where the object is a user's head and the geometric model is a plane.

Figure 9:
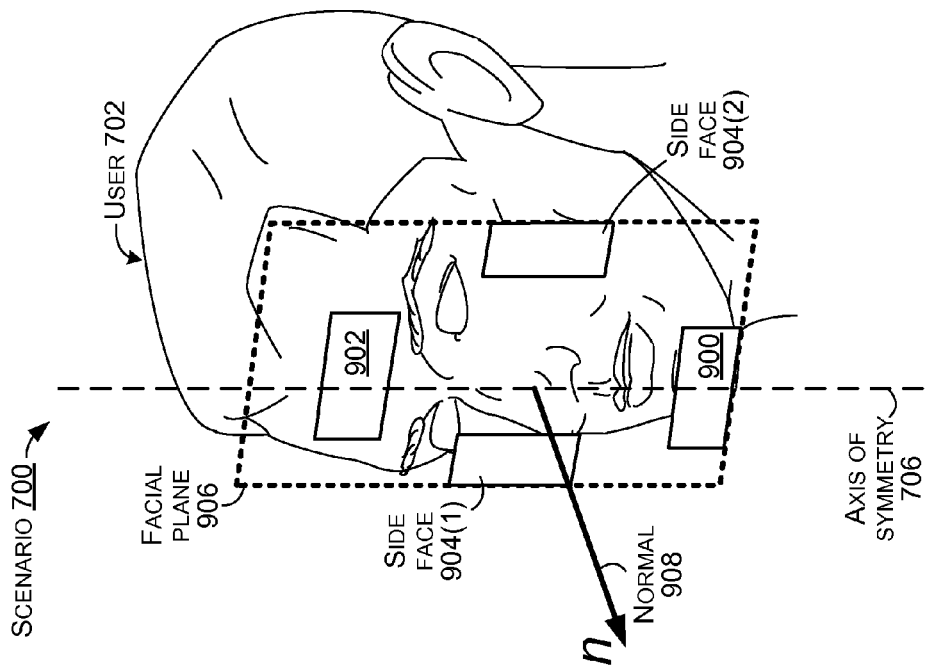
Figure 8:
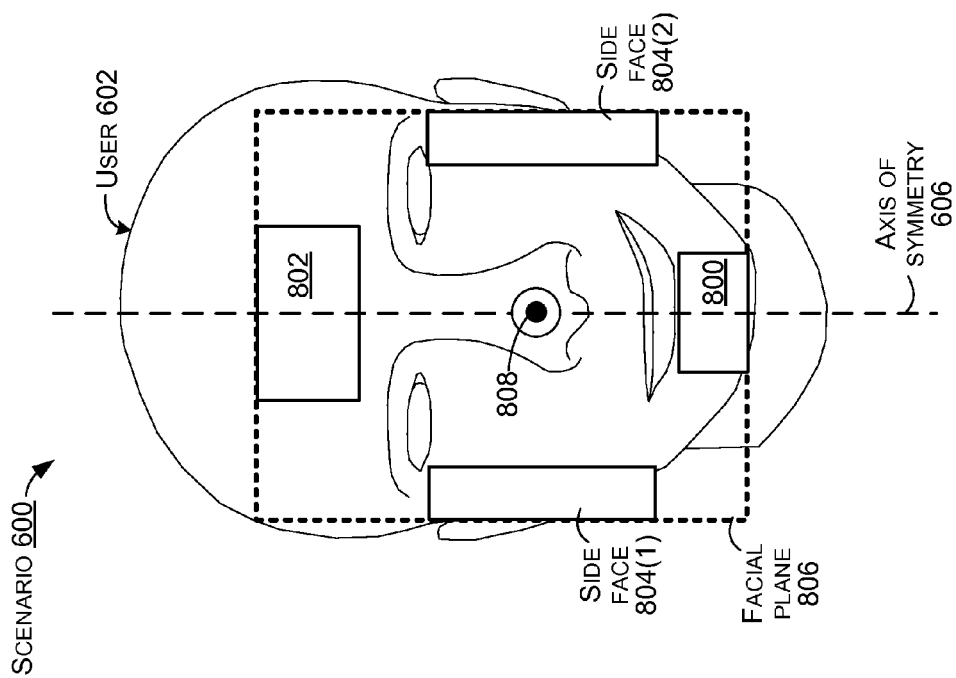

FIGS. 6 through 11 collectively illustrate exemplary manifestations of head orientation estimation scenarios 600 and 700. FIGS. 6, 8, and 10 collectively illustrate scenario 600, in which a first head orientation estimation technique is applied to a front view of a user 602. FIGS. 7, 9, and 11 collectively illustrate scenario 700, in which the first head orientation estimation technique is applied to a side view (e.g., oblique angle, profile shot) of a user 702. Scenario 700 is provided as a contrasting head orientation example to scenario 600 to help explain certain head orientation estimation concepts.

Briefly, FIGS. 6 and 7 relate to determining facial landmarks of a head of a user. These FIGS. can represent an example of block 502 of method 500 (see FIG. 5). FIGS. 8 and 9 relate to determining a facial plane of the head of the user, representing an example of block 504 of method 500. FIGS. 10 and 11 relate to using the facial plane to determine a rotation angle estimate of the head, representing an example of block 506 of method 500.

As shown in the example in FIG. 6, facial landmarks 604 can be identified for user 602 and can be used to determine an up vector (e.g., axis of symmetry) for the face. In this case, the facial landmarks can be represented as star symbols located at eye facial landmarks 604(1) and 604(2), a nose facial landmark 604(3), and corners of the mouth facial landmarks 604(4) and 604(5). In other implementations, more or fewer facial landmarks can be identified. The facial landmarks can be detected using a variety of available information, including 3D or 2D data, by a variety of methods. FIG. 6 also shows an axis of symmetry 606 applied to the image of user 602. The axis of symmetry can be determined relative to the facial landmarks. For example, the axis of symmetry can be a vector (e.g., face up vector) between a midpoint of the eye facial landmarks and a midpoint between the mouth facial landmarks.

As shown in FIG. 7, facial landmarks 704 of user 702 can include eye facial landmarks 704(1) and 704(2), a nose facial landmark 704(3), and corners of the mouth facial landmarks 704(4) and 704(5). In this example, axis of symmetry 706 is shown slightly to the right of the nose facial landmark 704(3) on the drawing page. As noted above, in some cases the axis of symmetry can pass through the nose facial landmark. In other cases, the axis of symmetry may be adjusted based on the positions of the facial landmarks 704 with respect to each other. In the example shown in FIG. 7, since the user is turned to one side, the nose facial landmark does not appear directly between the eyes or the corners of the mouth. Therefore, in this example the axis of symmetry is placed according to an estimate of the main bulk of the nose, rather than the tip of the nose. In other implementations, the precise placements of facial landmarks or an axis of symmetry can vary. Furthermore, in other cases the axis of symmetry may not be vertical.

In some implementations, the facial landmarks and/or axis of symmetry can be used to determine a facial plane, as will now be described relative to FIGS. 8 and 9. In scenarios 600 and 700, the available depth data may be unreliable due to poor resolution. To overcome this constraint, some implementations can extract areas of the face that are easier to differentiate given low resolution or noisy depth data. As illustrated in FIG. 8, scanning along the axis of symmetry 606 can be used to determine a chin area 800. In this case, the chin area can be determined by locating a significant increase in depth values, indicating a difference in distance between the chin and the neck of the user 602 from a depth camera. The difference in distance from a camera between the chin and the neck could provide a greater gradient in depth values than a difference between a tip of a nose and a cheek, for example. In some cases of low resolution or noisy depth data, the nose may not be discernible at all, while it may still be possible to differentiate the chin area in the image. The mouth can change significantly with facial expression and may not be reliable, and eyes may be obscured by eyeglasses. Therefore, in some cases the chin area can be a more reliable area of the face to use toward head orientation estimations than other features.

Similarly, also shown in the example in FIG. 8, a forehead area 802 and side face areas 804 may be more reliable facial areas to locate with low resolution or noisy depth data. The forehead area can be differentiated as a relatively flat surface along the axis of symmetry. The side face areas 804(1) and 804(2) can be differentiated as a difference in distance between either side of the face and a background object, in the view of a depth camera. In some implementations, a facial plane 806 can be determined from the chin area 800, the forehead area 802, and the side face areas 804. A normal 808 (e.g., normal vector) to the facial plane can also be determined. Since the example in scenario 600 is a frontal view of user 602, the normal 808 extends from the facial plane 806 out of the drawing page, and is therefore difficult to view in FIG. 8. Similar features are illustrated in the example in FIG. 9, including chin area 900, forehead area 902, side face areas 904(1) and 904(2), facial plane 906, and normal 908. Note that in FIG. 9, normal 908 is more easily viewed than normal 808 in FIG. 8, since the side view of user 702 places normal 908 at an angle with respect to the drawing page. For purposes of explanation, in this case scenario 600 in FIG. 8 can be considered as having yaw and pitch angles of zero, such that normal 808 extends straight out of the drawing page. In some cases, the two eyes and the two mouth corners can be used to determine a quadrilateral. In one example, a face center can be defined as an intersection point of diagonals drawn from the quadrilateral corners. The face center can be a point in 2D which can be mapped to the facial plane in 3D.

As illustrated in FIGS. 10 and 11, facial planes 806 and 906 and normals 808 and 908 can be utilized to estimate head orientation. Referring to FIG. 10, axes having corresponding angles of rotation can include pitch axis 1000, yaw axis 1002, and roll 1004. In the case of FIG. 10, roll is rotation about the normal. FIG. 11 provides a view of pitch 1100, yaw 1102, and roll 1104 relative to user 702. Note that the axes of rotation are arranged the same with respect to each user. For example, a change in yaw can represent a user turning their head to the side, while a change in pitch can represent the user looking up or down. Note that the yaw axis (e.g., yaw axis 1002) can be parallel to the axis of symmetry 606 or 706 in some cases. The pitch axis can be found from the cross product of the normal and the axis of symmetry.

To summarize, in one implementation an estimate of head orientation can be calculated from a sensor origin point (not shown), the face center, the normal 908, and the axis of symmetry 706. For example, a sensor vector (not shown) can be calculated from the sensor origin point to the face center. Rotation transformations between the sensor vector, the normal, and the axis of symmetry can be used to calculate each of the angles of roll, pitch, and yaw. FIG. 3 shows an example of the yaw angle (e.g., angle 306) between the sensor vector (e.g., arrow 302) and the facial plane (e.g., line 300).

Additional Example of First Technique for Estimating Object Orientation

FIGS. 12 through 19 collectively illustrate example manifestations of object orientation estimation scenario 1200, in which an estimation is made of an orientation of a user's head using a first technique. Scenario 1200 includes a user 1202. Note that in this case, user 1202 is wearing eyeglasses 1204, and has one hand 1206 in front of her face. In some implementations, it may be helpful to filter occlusions, such as eyeglasses or a hand, as will be described relative to FIGS. 13 through 19.

Figure 13:
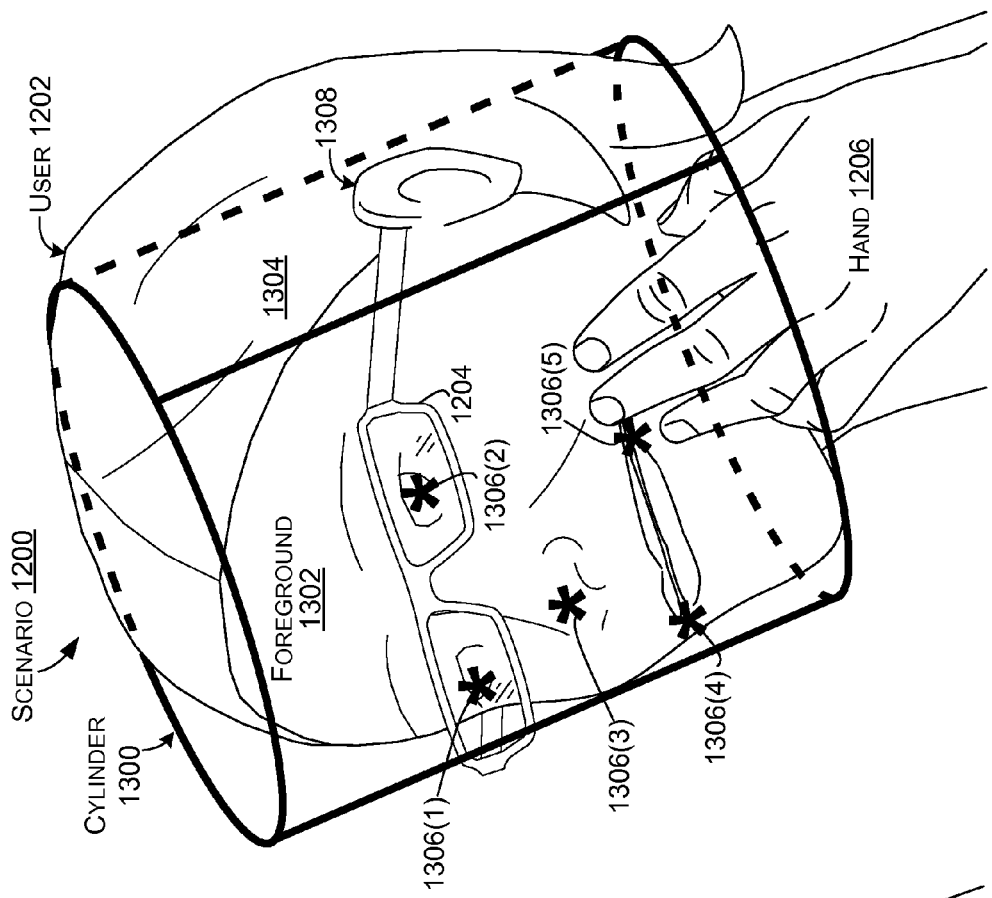
Figure 12:
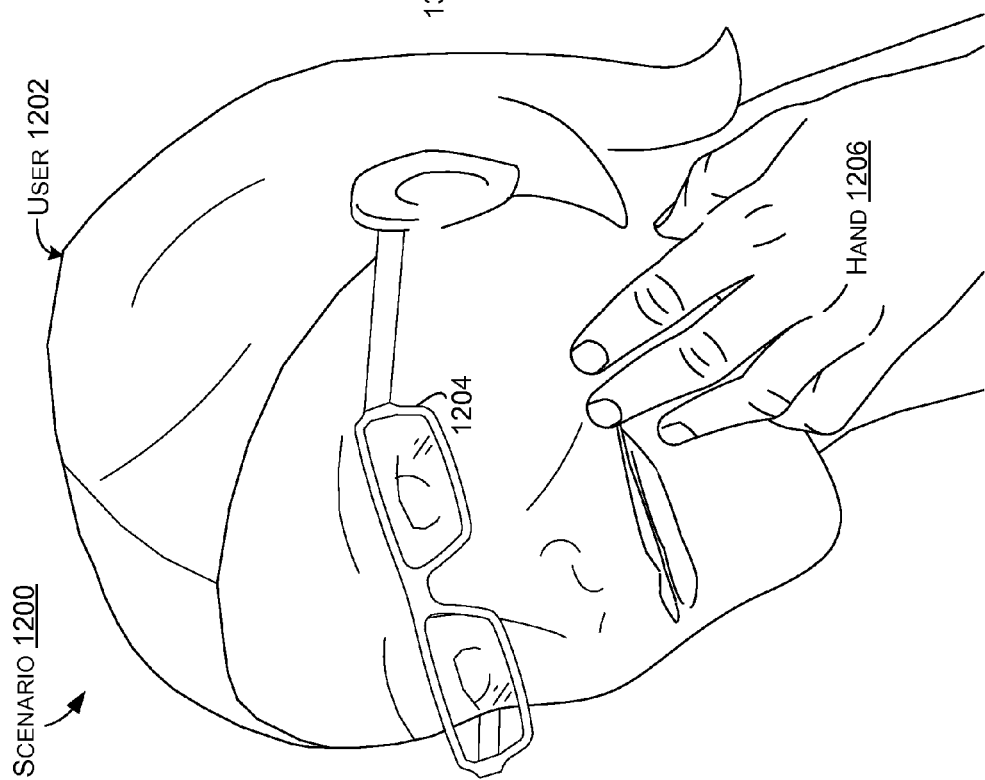

As shown in the example in FIG. 13, the head of user 1202 can be viewed as a cylinder 1300. In this example, detection of the face can include determination of a foreground 1302 and a background 1304 portion of the cylinder. The foreground can include facial landmarks 1306, which can be detected with 2D data. In some cases, depth data can be used to adjust and/or filter the face area, such as by excluding the background from further processing. For example, when the face is turned to one side, it can be helpful to exclude the side of the face as part of the background. In this example, the left ear area 1308 of user 1202 can be excluded as background on the right hand side of the drawing page. Other approaches for isolating a face area of a user are considered.

As shown in FIG. 14, isolation of the foreground 1302 of the face of user 1202 can produce facial mask 1400. In some cases, the facial mask can be considered a combination of a silhouette and prominent facial features which can be extracted from both 2D (e.g., IR) and depth data corresponding to user 1202. Note that the examples in FIGS. 13 and 14 also include the eyeglasses 1204 and the hand 1206 of user 1202. Elements such as eyeglasses or objects in front of a face can produce artifacts in depth data processing that can degrade the quality of head orientation estimates. Further processing can be used to exclude such elements, as will be described relative to FIGS. 15 through 18.

As illustrated in FIG. 15, a pixel grid 1500 can be laid over facial mask 1400. Depths can be assigned to each pixel of the facial mask using depth data, representing how far each pixel is from the sensor that collected the depth data. In some cases, the pixel grid could be made more or less dense based on how close user 1202 is to a sensor, such as sensors 210 (see FIG. 2). Although methods of head orientation estimation that rely on TOF depth data may produce high quality results when a user is close to the TOF camera, the head orientation estimation method described in scenario 1200 may provide some computational efficiency in this regard. Further, the processing time of the method in scenario 1200 could be reduced if the number of processed pixels were reduced.

FIGS. 16 and 17 show example histograms 1600 and 1700 which can be used to filter occlusions from the facial mask 1400. FIG. 16 shows histogram 1600, including depth values at pixels corresponding to a transect A-A' of the pixel grid 1500. FIG. 17 shows histogram 1700, including depth values at pixels corresponding to a transect B-B'. In FIG. 16, the face of the user is represented as peak 1602, which can correspond to a certain depth range in the image. Transect A-A' can also pass over a small portion of wall behind the user (e.g., to the left of the face of the user as seen in FIG. 15). The wall can contribute an additional peak 1604 to histogram 1600, where peak 1604 represents a smaller amount of pixels at a greater mean depth value (e.g., further to the right along the depth axis) than peak 1602. Note that transect B-B' includes the eyeglasses 1204 (shown but not designated in FIG. 15). Therefore the eyeglasses appear as peak 1702 in histogram 1700, which is at a lower mean depth value than the face of the user represented by peak 1704. In general, additional peaks in a histogram can be viewed as corresponding to background areas, occlusions, artifacts, or potentially erroneous or poor quality depth data. Areas of a histogram can be identified as additional peaks by any of a variety of methods, such as comparison to expected facial depth profiles. In other cases, additional peaks can be identified as outliers in the depth data, using any of a variety of statistical methods. In some implementations, data corresponding to additional peaks can be excluded (e.g., filtered) from the facial mask or smoothed to facilitate higher quality head orientation estimates. In scenario 1200, excluding data corresponding to eyeglasses 1204 and hand 1206 can result in a valid mask 1800 (e.g., restricted facial mask), shown in FIG. 18.

Note that in other cases, additional peaks corresponding to objects other than the face of the user could be larger than a peak corresponding to the face of the user. For example, in some cases a wall behind the user may contribute a larger number of pixels at a greater depth than the face of the user, resulting in a relatively larger peak. Some implementations use depth associated with pixels inside a face quadrilateral (determined from the two eye landmarks and the two mouth corner landmarks) to distinguish between the peak caused by the face and the additional peak caused by the wall in the background. Whether the peak associated with the face of the user is the largest peak in the histogram may be a function of the size and/or extent of a detected face box used for this processing.

Figure 19:
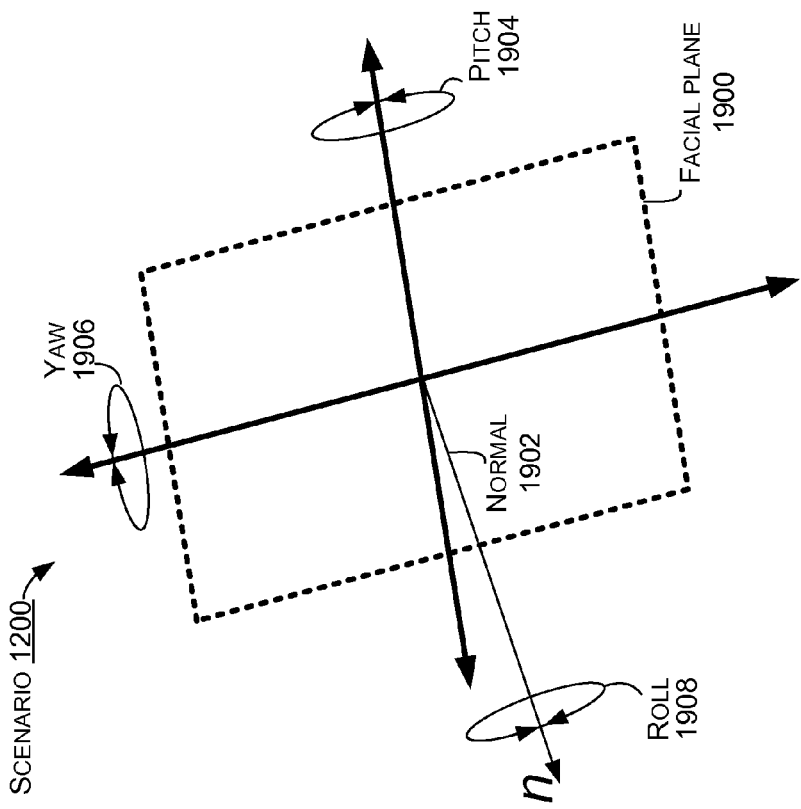
Figure 18:
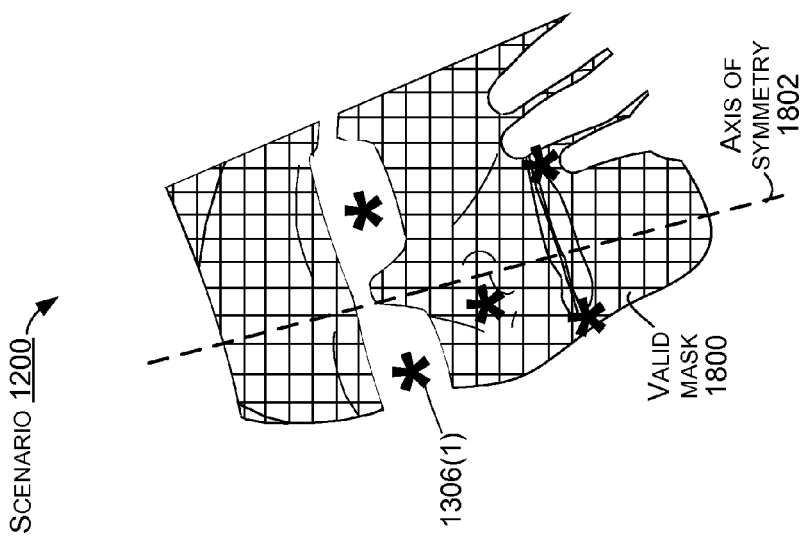

As illustrated in FIG. 18, the facial landmarks 1306 can be used to derive an axis of symmetry 1802 for the valid mask 1800. As illustrated in FIG. 19, a facial plane 1900 can be derived from the valid mask. For example, the facial plane can be derived as shown relative to FIGS. 8 and 9 above, using the axis of symmetry. Referring again to the example in FIG. 19, a normal 1902 can be derived for the facial plane. As discussed above relative to FIGS. 10 and 11, pitch 1904, yaw 1906, and roll 1908 can be derived from the facial plane, normal, valid mask, axis of symmetry, and/or facial landmarks.

To summarize, a first technique can estimate head orientation utilizing depth data and 2D data. The first technique may be simplified such that a head orientation estimate is produced even given poor quality depth data. To check the quality of the head orientation estimate, the first technique can be validated with the result of a second technique using 2D data, which will be described below.

Examples of Second Technique for Estimating Object Orientation

Figure 20:
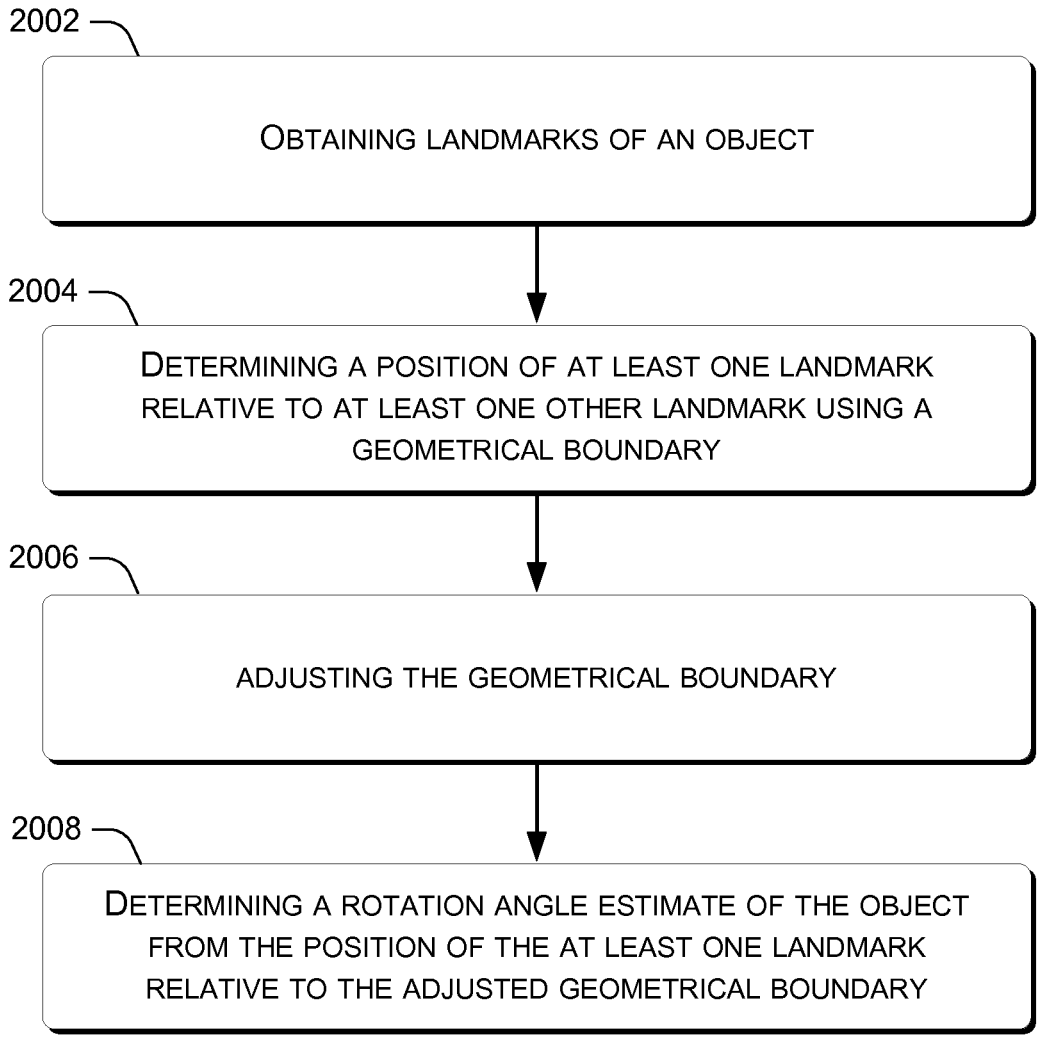

FIG. 20 shows an example method 2000 consistent with the present concepts. Method 2000 can represent a second, geometrical object orientation estimation technique. In some cases, method 2000 can perform block 106 of method 100 (see FIG. 1).

At block 2002, method 2000 can obtain landmarks of an object. In the case where the object is a user's head, the landmarks can be facial landmarks of a face of the head of the user, as discussed above.

At block 2004, method 2000 can determine a position of at least one landmark relative to at least one other landmark using a geometrical boundary such as a quadrilateral. In some implementations, the determination of the position of the at least one landmark can be a binary determination, e.g., whether the landmark is inside or outside of the boundary.

At block 2006, method 2000 can adjust the geometrical boundary. In some implementations, the geometrical boundary can be iteratively adjusted based on the outcome of the binary determination of the position of the at least one facial landmark. The method can iterate between blocks 2004 and 2006 until a decision point is reached, which will be described further below relative to FIGS. 21 and 22. As such, the method can be an iterative binary technique.

At block 2008, method 2000 can determine a rotation angle estimate of the object from the position of the at least one landmark relative to the adjusted geometrical boundary. In some cases, the rotation angle estimate can be a yaw estimate.

Figure 21:
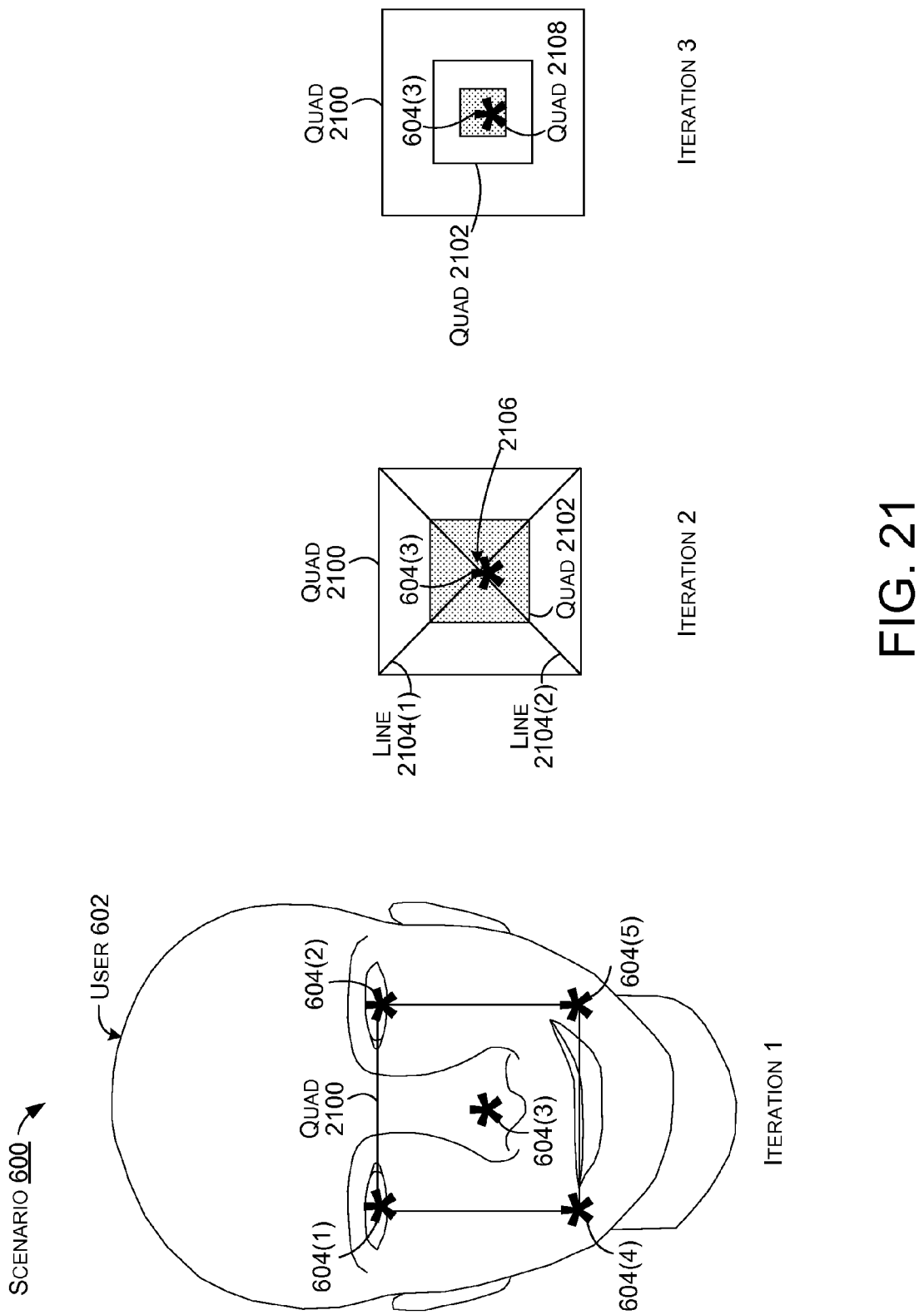
Figure 22:
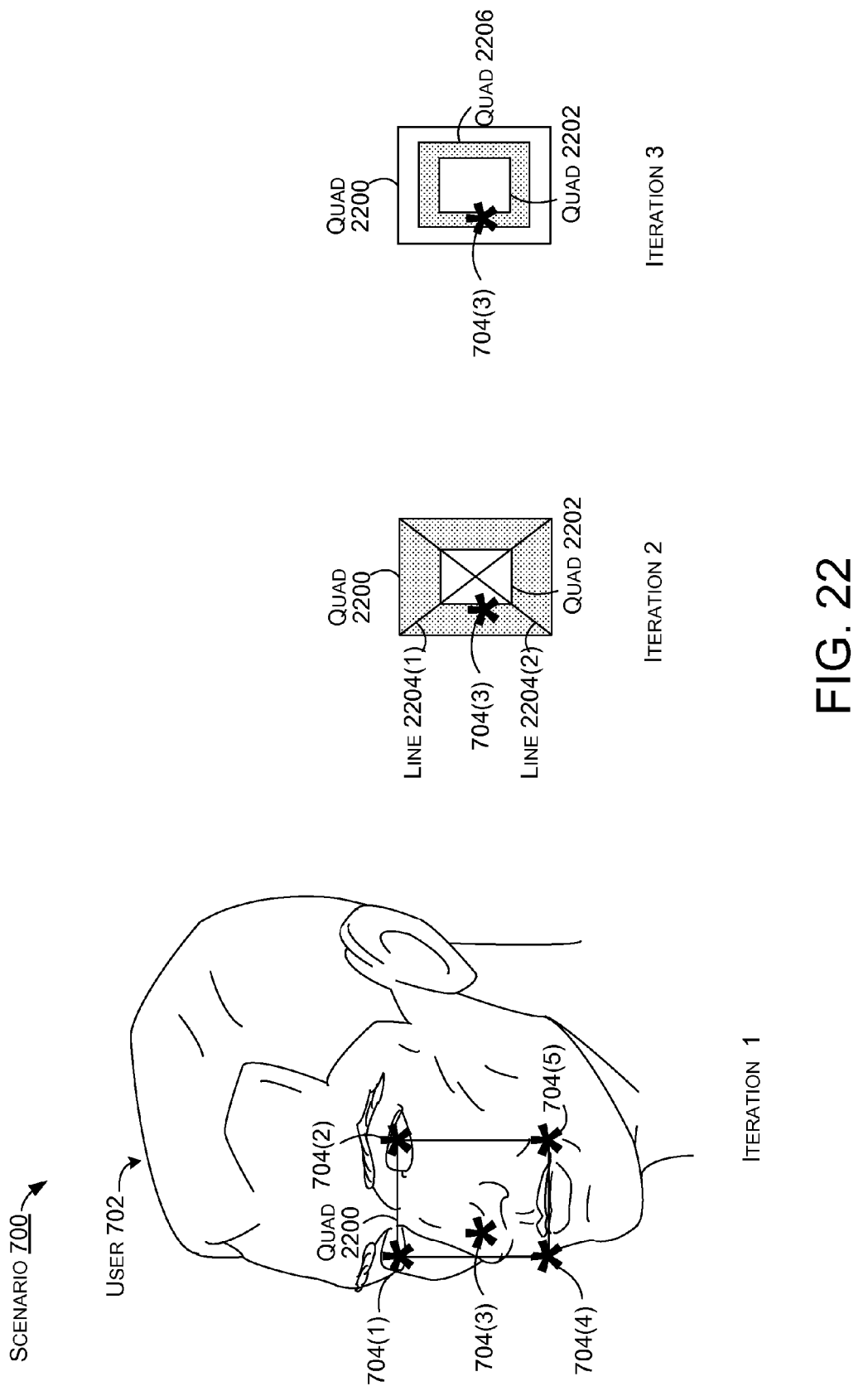

FIGS. 21 and 22 illustrate application of the second technique for estimating object orientation relative to scenarios 600 and 700 (introduced above relative to FIGS. 6 and 7), in which case the object is a user's head. As shown in the examples in FIGS. 21 and 22, a geometrical technique can be applied utilizing facial landmarks 604 or 704. Note that in some cases, the facial landmarks may have been determined from 2D data, therefore the example head orientation estimation technique illustrated in FIGS. 21 and 22 may not rely on depth data and thus may be relatively robust under circumstances where depth approaches might tend to be less robust. Generally, in some implementations, a determination can be made whether to proceed with a second technique for estimating head orientation. For example, the determination of the second rotation angle estimate can be triggered at a certain distance of a user from sensor(s) supplying the information for the rotation angle estimate(s). In some cases, the determination of the second rotation angle estimate can be made by taking into account distance and/or face size of the user.

As illustrated in Iteration 1 of the example in FIG. 21, a quadrilateral (quad) 2100 can be drawn using facial landmarks 604(1), 604(2), 604(4), and 604(5). In some implementations, a binary search can be performed where each iteration can determine whether facial landmark 604(3), representing the nose, is inside or outside of a given quadrilateral. Note that in a case of a profile view of a user, a facial landmark representing a nose could be outside of a similar quadrilateral. In this case, facial landmark 604(3) is inside quadrilateral 2100. At Iteration 2, a second quadrilateral 2102 can be drawn. A variety of methods for generating quadrilateral 2102 are contemplated. In this case, lines 2104 can be drawn between opposite corners of quadrilateral 2100, creating an intersection 2106 (e.g., a face center). Subsequently, midpoints of each of the lines between the intersection 2106 and each corner of quadrilateral 2100 can be used to establish corners of quadrilateral 2102 (shown but not designated). In this case, the binary geometrical technique can be used to determine whether facial landmark 604(3) is inside or outside quadrilateral 2102. In this case, facial landmark 604(3) is inside quadrilateral 2102, which can reduce the area for further binary searches to the shaded region inside quadrilateral 2102.

Iteration 3 of FIG. 21 illustrates a further iteration of the binary search, including quadrilateral 2108. The technique is iterated by successively dividing the space with quadrilaterals, and determining the location of facial landmark 604(3) relative to each quadrilateral, e.g., inside or outside of the quadrilateral. In this case the location of facial landmark 604(3) inside quadrilateral 2108 suggests a relatively low yaw angle. Stated another way, since scenario 600 generally depicts a frontal view of user 602, the head of user 602 is not turned to either side, and the facial landmark 604(3) is located inside successively smaller, centered quadrilaterals. Therefore the shaded area is reduced to the area inside quadrilateral 2108. The number of iterations can be adjusted based on a variety of factors, such as available computational resources of the system, a computational budget, and/or a desired resolution.

FIG. 22 illustrates an example of the binary search technique applied to scenario 700. At Iteration 1, facial landmarks 704 can be used to draw quadrilateral 2200. In this case, facial landmark 704(3) is found to be inside quadrilateral 2200, and the technique progresses to Iteration 2, where quadrilateral 2202 is drawn using lines 2204. However, in this case, facial landmark 704(3) is found to be outside quadrilateral 2202, since scenario 700 represents a side view of user 702. Therefore, the shaded area for further binary searching is outside quadrilateral 2202. In Iteration 3, quadrilateral 2206 can be drawn outside of quadrilateral 2202, but still inside quadrilateral 2200. In this case, facial landmark 704(3) is found to be inside quadrilateral 2206. The relative position of facial landmark 704(3) in the shaded area inside quadrilateral 2206 and outside quadrilateral 2202 can give an estimation of yaw of the head of user 702.

Other geometrical techniques can be used in other implementations to generate estimates of one or more angles of rotation of the head. In some implementations, instead of quadrilaterals, sidelines could be drawn through the right side and left side facial landmarks corresponding to the eyes and corners of the mouth (not shown). For example, referring to FIG. 21, a sideline (not shown) could be drawn from facial landmark 604(1) to 604(4), and another sideline could be drawn from facial landmark 604(2) to 604(5). The technique could then determine if facial landmark 604(3) was to the right or left of either of the sidelines to check the yaw estimate. In another implementation, a line (not shown) could be drawn between the facial landmarks corresponding to the eyes, and another line could be drawn between the facial landmarks corresponding to the corners of the mouth. Then, pitch could be checked by determining whether the facial landmark corresponding to the nose was above or below either of the lines. This example technique could also be iterated. In still other implementations, a second technique could be used to make a second estimate of roll using an axis of symmetry derived from 2D data only.

The techniques illustrated in FIGS. 21 and 22 may not produce as accurate a yaw angle estimate as techniques using depth data, however the techniques illustrated in FIGS. 21 and 22 may also not be as sensitive to distortions or artifacts as techniques using depth data. Thus, the geometrical technique shown in the examples in FIGS. 21 and 22 can be used to improve the accuracy of a head orientation estimation.

In other implementations, homography warping can be used as an alternative to the iterative technique to determine a second estimate of an angle of rotation of the head. For example, homography warping can be used to transform quadrilateral 2200 into a square. Facial landmark 704(3) can be mapped to the square. In this example, the coordinates of facial landmark 704(3) can be used to calculate the second estimate of the angle of rotation of the head.

Object Orientation Correction Examples

Figure 23:
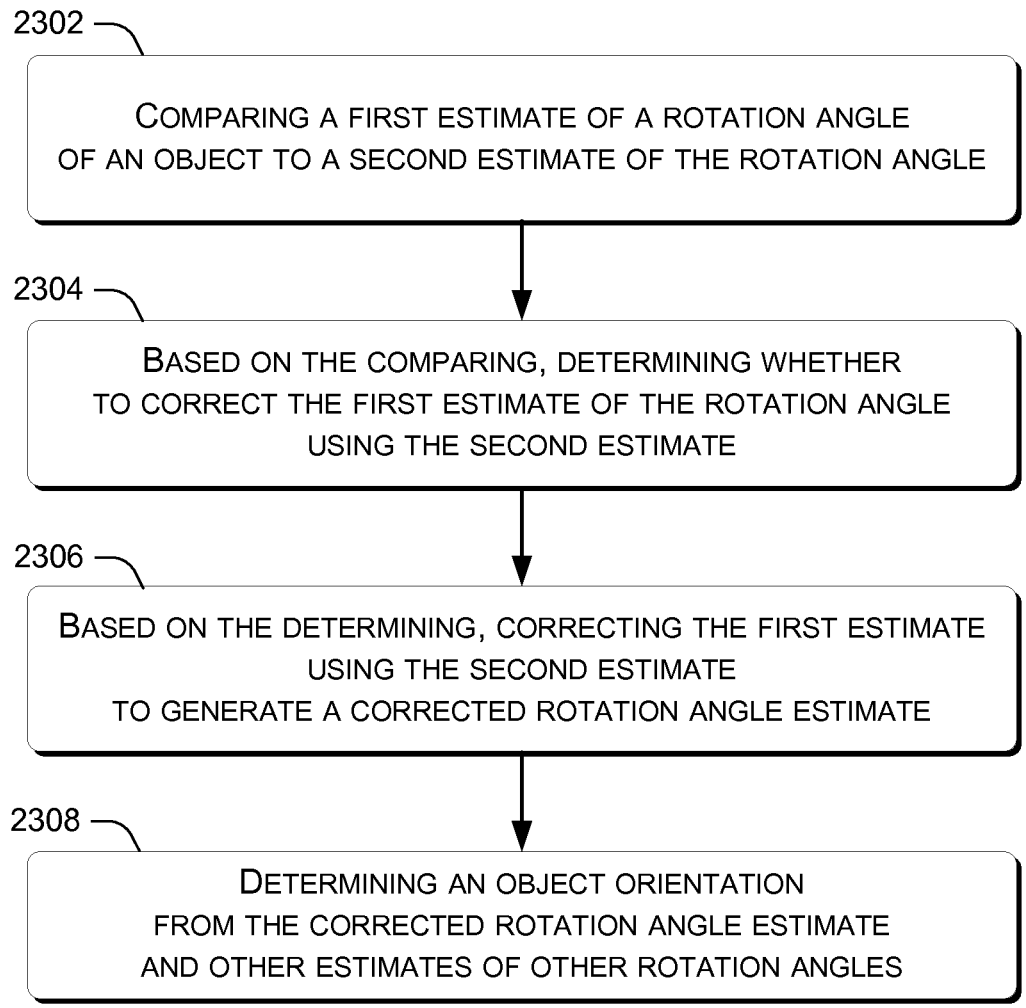

FIG. 23 shows an example method 2300 consistent with the present concepts. Method 2300 can represent an object orientation correction technique using orientation estimates determined by a first and a second estimation technique. In some cases, method 2300 can perform block 108 of method 100 in FIG. 1.

At block 2302, method 2300 can compare a first estimate of a rotation angle of an object to a second estimate of the rotation angle. In some cases, the object can be the head of a user.

At block 2304, based on the comparing in block 2302, method 2300 can determine whether to correct the first estimate of the rotation angle using the second estimate. For example, the method can determine an extent to which the second estimate of the rotation angle is consistent with the first estimate.

At block 2306, based on the determining in block 2304, method 2300 can correct the first estimate using the second estimate to generate a corrected rotation angle estimate.

At block 2308, method 2300 can determine an object orientation from the corrected rotation angle estimate and other estimates of other rotation angles. For example, a corrected yaw angle estimate can be used to determine an object orientation estimate. Additionally or alternatively, corrected pitch and/or roll estimates could be used to determine an object orientation estimate.

Figure 24:
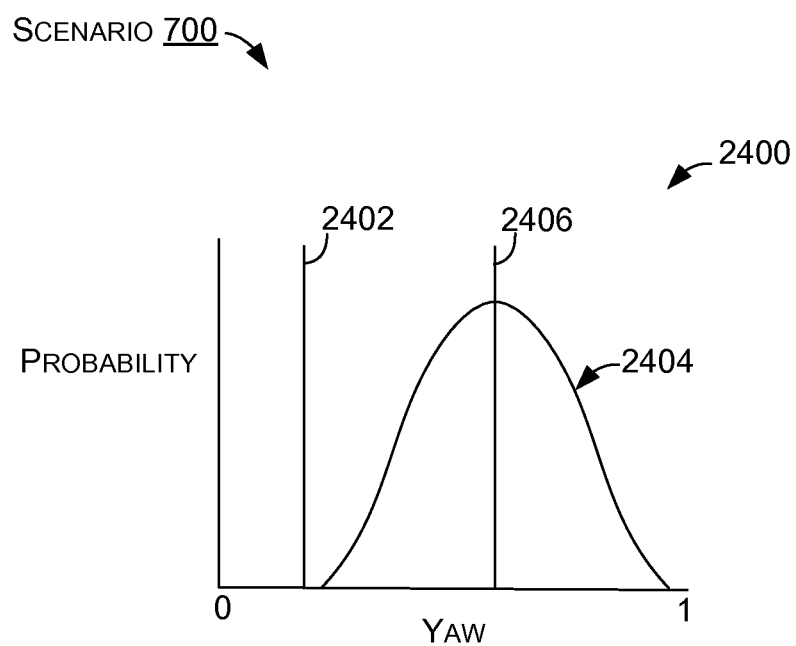

FIG. 24 illustrates example object orientation correction techniques relative to scenario 700, in which case the object is a user's head. FIG. 24 includes a probability graph 2400. Graph 2400 includes a yaw result produced by the first head orientation estimation technique (described above relative to FIGS. 7, 9, and 11), plotted as line 2402. Graph 2400 also includes a yaw result from the second head orientation estimation technique (described above relative to FIG. 22) for scenario 700, plotted as a distribution curve 2404. In this example, the second technique can give a probability density which can be used to determine a confidence level in the estimate from the first technique. In some implementations, if the results from the first and second techniques do not agree, the result from the second technique can be used to replace the result from the first technique.

In the example shown in FIG. 24, probability graph 2400 has an axis normalized to a range of 0 to 1, with 0 representing zero degrees yaw and 1 representing 40 degrees yaw. In some cases, a yaw angle of 40 degrees can be a limit of an effective yaw angle for head orientation purposes. Stated another way, yaw angles greater than 40 degrees can be considered profile views of the user. Precise yaw angle measurements beyond 40 degrees may not be helpful for head orientation purposes, such as user command interpretation when the user is not looking at a display.

Distribution curve 2404 can be considered a permitted distribution of values for yaw. A peak of the distribution curve can be represented by line 2406. In some implementations, the distribution curve can be provided relative to the size of the quadrilaterals that were produced in the second technique shown in FIG. 22. For example, the range of yaw values represented in the distribution curve can correspond to the range of values from the edge of quadrilateral 2202 to the edge of quadrilateral 2206. In other implementations, the distribution curve can have a predetermined variance. For example, a user with a longer nose will generate a greater yaw angle estimate with the second technique when the head is turned 30 degrees to one side, since the longer nose will appear further to one side than a shorter nose. Therefore, in some cases a predetermined variance can be learned from training with different nose lengths or other facial geometry differences between users. In other implementations, the distribution curve can be generated from either measured or predetermined variances, or a combination of measured and predetermined variances. Also, the distribution curve can be a step-function or a curve, or any of a variety of shapes. In still other cases, the first estimate represented by line 2402 can also have a distribution.

In still other implementations, the distribution curve 2404 can be weighted. For example, referring again to FIG. 22, the yaw angle estimate for a facial landmark appearing inside quadrilateral 2202 can receive greater weight than a facial landmark appearing outside quadrilateral 2206. In this example, a lower yaw angle estimate (e.g., for a facial landmark inside quadrilateral 2202) may be considered as having a higher associated confidence level than a higher yaw angle estimate. Accordingly, a distribution curve for a lower yaw angle estimate may have a narrower curve and/or a higher peak. In other examples, specific weights can correspond to specific quadrilaterals in the second technique. Other weighting methods may also be employed.

In some implementations, the yaw angle estimate produced with the first technique can be checked (e.g., validated) with the second technique. For example, the second technique can give a confidence level in the yaw angle estimate produced with the first technique that relied on depth data. In example scenario 700, referring again to FIG. 24, the yaw result from the first technique can include distortion from the depth data, similar to the distortion described relative to FIGS. 3 and 4. Therefore, in this case, the yaw result from the first technique represented by line 2402 suggests a lower yaw value than the distribution curve 2404 from the second technique. Since line 2402 falls on a relatively low probability portion of the distribution curve, it appears in this case that the yaw angle estimate produced with the first technique may be inaccurate. In some cases, training data can be used to learn a threshold for variance of the first estimate from the second estimate before correction is suggested. The check using the second technique can be performed on one or more angles of rotation. In some cases, checking yaw can be sufficient for improving the quality of overall head orientation estimates in situations with low resolution or noisy depth data.

In some implementations, the yaw angle estimate produced with a first technique can be corrected using results from a second technique. In scenario 700, the yaw estimate at line 2402 from the first technique can be replaced with the yaw estimate represented by peak 2406 of the distribution curve 2404. In other cases, a corrected yaw angle estimate can be produced by combining results from both techniques. In these cases, estimates from the first and second techniques can be weighted a variety of ways before being combined to produce a corrected yaw angle estimate. For example, a delta can be calculated as the difference between the first and second estimates. A weight w can be represented as:

$$w = \exp(-delta/sigma),$$

where sigma can be a width of the probability distribution of the second estimate. In this example, the corrected estimate can be:

$$corrected = w*estimate1 + (1-w)*estimate2.$$

In other implementations, factors contributing to the weighting of the first and second estimates can include a height of the peak of the distribution curve 2404, how close line 2402 is to line 2406 (e.g., extent to which they are consistent), and/or whether line 2402 falls within the distribution curve. In some cases, one or more weight(s) can be assigned according to the distance of the head from a camera that collects depth data used by the first technique. In another example, the second technique yaw estimate can be used in place of the first technique yaw estimate based on the distance of the head from the camera or the size of the face of the user. In other implementations, the second technique estimate could be used when the face of the user is in profile or near-profile. Other techniques for weighting yaw estimates are considered, including combining parameters to produce weights.

Example System

Figure 25:
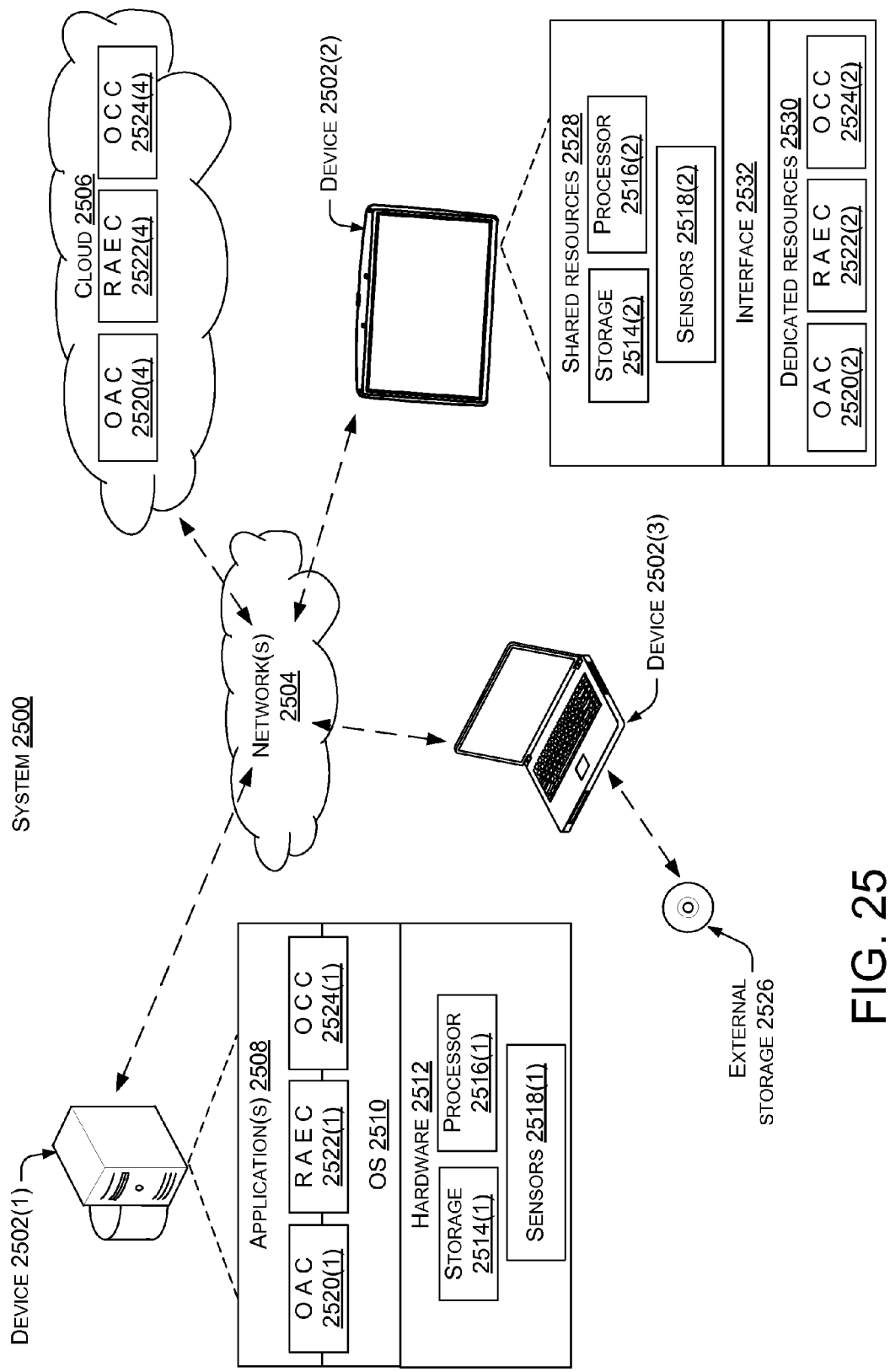
FIG. 25 illustrates an exemplary object orientation estimation system consistent with some implementations of the present concepts.

FIG. 25 illustrates an example system 2500 in which the described techniques may be implemented in accordance with some embodiments. Examples of several types of object orientation estimation devices 2502 are illustrated relative to system 2500. For purposes of explanation, three object orientation estimation devices 2502(1), 2502(2), and 2502(3) are illustrated. For sake of brevity only two of the illustrated devices are described in detail. This description can be applied to other devices. This description is also intended to provide examples of device configurations that can be employed to support object orientation estimation concepts. The skilled artisan will recognize other device configurations that can support the described object orientation estimation concepts.

In this case, device 2502(1) is manifest as a gaming console. Device 2502(2) is manifest as a tablet type device. Device 2502(3) is manifest as a laptop or notebook type computer. The term "device" as used herein can mean any type of device that has some amount of processing capability. While specific examples of such devices are illustrated for purposes of explanation, other examples of such devices can include traditional computing devices, such as personal computers, cell phones, smart phones, personal digital assistants, or any of a myriad of ever-evolving or yet to be developed types of devices.

In system 2500, individual devices 2502 can exchange data over network(s) 2504. These devices can function in a stand-alone or cooperative manner to implement the described techniques. For instance, part of a functionality offered on a device may be performed on the device and part may be performed on another device and/or in the cloud 2506. As used herein, the cloud 2506 refers to computing resources and/or computing functionalities that can be accessed over network 2504. Without limitation, the network(s) can include one or more local area networks (LANs), wide area networks (WANs), the Internet, and the like.

A multitude of different device configurations can be created to accomplish object orientation estimation concepts. For purposes of explanation, examples of two possible device configurations are described below relative to device 2502(1) and 2502(2).

Device 2502(1) includes an application(s) 2508 running on an operating system (OS) 2510. The operating system can interact with hardware 2512. Examples of hardware can include storage media or storage 2514(1), processor(s) 2516(1) (e.g., processing devices), and/or sensor(s) 2518(1) (e.g., depth camera, IR camera, RGB camera, etc.). Further, an object analysis component (OAC) 2520(1), a rotation angle estimation component (RAEC) 2522(1), and an orientation correction component (OCC) 2524(1) can function in cooperation with application(s) 2508 and/or operating system (OS) 2510 and/or hardware 2512. In one configuration, these components 2520-2524 can be manifest as an application, an application part, or as part of the operating system.

Processor 2516(1) can execute computer-executable instructions to provide a functionality. Computer-executable instructions and/or user-related data can be stored on storage 2514(1). Storage 2514(1) can include any one or more of computer-executable memory devices, volatile or non-volatile memory, hard drives, and/or optical storage devices (e.g., CDs, DVDs, etc.), among others.

The devices 2502 can also be configured to receive and/or generate data and/or computer-executable instructions from external storage 2526 that for sake of explanation can be thought of as external storage media. Examples of external storage media can include optical storage devices (e.g., CDs, DVDs, etc.), hard drives, and flash storage devices (e.g., memory sticks or memory cards), among others. The devices 2502 may also receive data and/or computer-executable instructions over network 2504 that is then stored on the device 2502 for execution by its processor.

The sensor(s) 2518 can comprise any of a variety of optical or other types of sensors for collecting 2D image and/or depth data, as detailed above relative to the description of FIG. 2. For example, the sensors can collect data in the form of IR, TOF, structured light, stereo images, RGB, monochrome, color, and/or video. In some cases, the sensors may be distinct and/or may be part of the device 2502 (e.g., a gaming console with a camera).

Device 2502(2) has an alternative configuration that can be representative of a system on a chip (SOC) type design. In such a case, functionality provided by the device can be integrated on a single SOC or multiple coupled SOCs. In this case, device 2502(2) includes shared resources 2528 and dedicated resources 2530. An interface(s) 2532 facilitates communication between the shared resources and the dedicated resources. As the name implies, dedicated resources 2530 can be thought of as including individual portions that are dedicated to achieving specific functionalities. For instance, in this example, the dedicated resources include object analysis component 2520(2), rotation angle estimation component 2522(2), and orientation correction component 2524(2). In one case, circuitry on the SOC can be dedicated to the object analysis component 2520(2) while other circuitry can be dedicated to the rotation angle estimation component 2522(2), and still other circuitry can be dedicated to the orientation correction component 2524(2).

Shared resources 2528 can be storage, processing units, etc. that can be used by multiple functionalities. In this example, the shared resources include sensors 2518(2). While in this case, object analysis component 2520(2), rotation angle estimation component 2522(2), and orientation correction component 2524(2) are implemented as dedicated resources 2530, in other configurations, either or any of these components can be implemented on the shared resources 2528 and/or on both the dedicated resources 2530 and the shared resources 2528.

Generally, any of the functions described herein can be implemented using software, firmware, hardware (e.g., fixed-logic circuitry), manual processing, or a combination of these implementations. The term "component" as used herein generally represent software, firmware, hardware, whole devices or networks, or a combination thereof. In the case of a software implementation, for instance, these may represent program code that performs specified tasks when executed on a processor (e.g., CPU or CPUs). The program code can be stored in one or more computer-executable memory devices, such as computer-executable storage media. The features and techniques of the component are platform-independent, meaning that they may be implemented on a variety of commercial computing platforms having a variety of processing configurations. Generally, devices 2502 can alternatively or additionally include other elements, such as buses, graphics cards (e.g., graphics processing units (GPUs), network hardware), etc., which are not illustrated or discussed here for sake of brevity.

The object analysis component 2520 can be configured to receive sensed 2D image and/or depth data from sensors 2518. The object analysis component can be configured to process the sensed data to detect and/or isolate objects (e.g., user heads). In a case where the object is a head of a user, the isolation and detection of the face can be accomplished using any suitable face detection technologies and/or algorithms as noted above. The object analysis component can be configured to determine landmarks, a geometric model, a facial mask, a facial plane, and/or a normal vector, as described above. The object analysis component can also be configured to provide other information, such as a distance of the object from the sensor(s) and/or a likely presence of a source of distortion or artifacts, such as a nearby wall or an occlusion.

The rotation angle estimation component 2522 can be configured to receive information from the object analysis component 2520, and use that information to determine an object orientation estimate(s) relative to translation and/or rotation of an object. For instance, where the object is a user's head, the rotation angle estimation component can determine estimates of angles of rotation of the head relative to axes corresponding to yaw, pitch, and roll. In some implementations, the rotation angle estimation component can use depth data to determine estimates of the angles of rotation related to yaw, pitch, and roll. In some implementations, the rotation angle estimation component can be configured to produce an estimate of head orientation using the depth data.

The orientation correction component 2524 can be configured to receive information from the object analysis component 2520 and/or the rotation angle estimation component 2522, and use that information to produce estimates of angles of rotation of an object and/or correct estimates of angles of rotation produced by the rotation angle estimation component. The orientation correction component can use 2D data to determine a second estimate of the angle of rotation related to yaw. In some implementations, the orientation correction component can be configured to determine a confidence level in the estimates of the angles of rotation of the object produced by the rotation angle estimation component, and choose whether to produce second estimates of any of the angles of rotation based on the confidence level.

For example, in a case where the object is a user's head, the orientation correction component 2524 could receive information from the object analysis component 2520 suggesting that the user is near a wall, providing a possible source of distortion to the estimates of angles of rotation produced by the rotation angle estimation component 2522. In another example, the orientation correction component could determine a relatively high confidence level in the estimates of angles of rotation produced by the rotation angle estimation component, and output a final head orientation estimate without determining new angles of rotation. The orientation correction component can perform other functions related to the data and/or estimates of angles of rotation, such as performing statistical analyses. For example, the orientation correction component can determine probabilities related to estimates of angles of rotation of the head produced by the rotation angle estimation component and/or the orientation correction component.

Finally, the orientation correction component 2524 can be configured to generate an object orientation estimate by correcting and/or combining the estimates of the angles of rotation of the object. The object orientation estimate can be produced from the estimates of the angles of rotation determined by the rotation angle estimation component 2522 and/or a corrected angle(s) of rotation produced by the orientation correction component. The orientation correction component can output the object orientation estimate, the corrected object orientation estimate, estimates of angles of rotation of the object, and/or other data.

Stated another way, where the object is a user's head, the object analysis component 2520 can receive information from the sensors 2518 and recognize faces or face components using the information. The rotation angle estimation component 2522 can estimate angles of rotation of the head relative to axes corresponding to yaw, pitch, and roll. The orientation correction component 2524 can correct one or more of the estimates of angles of rotation and produce a final, or corrected, head orientation estimate.

The methods described herein can be performed by the systems and/or devices described above relative to FIG. 25, and/or by other devices and/or systems. The order in which the methods are described is not intended to be construed as a limitation, and any number of the described acts can be combined in any order to implement the method, or an alternate method. Furthermore, the method can be implemented in any suitable hardware, software, firmware, or combination thereof, such that a device can implement the method. In one case, the method is stored on computer-executable storage media as a set of instructions such that execution by a computing device causes the computing device to perform the method.

To summarize, object orientation estimation techniques can be combined to produce a more confident object orientation estimate in environmentally and/or operationally constrained scenarios. A combination of simple geometry-based techniques can be faster and more accurate than other approaches. The techniques can be any of a wide variety of techniques for determining object orientation estimates from various types of sensing data. The combination of techniques could also augment other results, such as in face recognition, facial expression detection, and/or gender detection scenarios.

CONCLUSION

The present techniques can be used to estimate an orientation of an object. For example, a first technique can be used to make a first estimate of orientation of an object for which landmarks and an up vector (e.g., axis of symmetry) can be determined. Subsequently, a second technique can use 2D data to make a second estimate of the orientation of the object. The second estimate can be used to provide a measure of confidence in the first estimate and in some cases, correct the first estimate.

In some implementations, the present techniques can be used to estimate a head orientation of a user. In other implementations, the present techniques can be used to estimate an orientation of another physical object. For example, an orientation of a vehicle can be estimated using the present techniques. In this example, landmarks of the object can include vehicle features such as headlights, wheels, and/or a windshield. In another example, an orientation of a computing device can be estimated. In this example, the corners of the computing device or the screen could be used as landmarks.

In yet other implementations, it can be helpful to estimate the orientation of a user, the user's head, the user's arm(s), the user's hand(s), another body part of the user, and/or an object the user is holding. For example, an orientation estimation could be useful where the user is interacting with a computer game using an object, such as a handheld object or a body part. As discussed above, an orientation can be estimated with a first technique using depth and 2D data. The first estimate can be checked with a second technique using 2D data, consistent with the present concepts. A specific example can include a user interacting with an application simulating a tennis game. In this example, the user could be making an arm-swinging motion while pretending to hold a tennis racket. In this case, an estimated orientation of one or both of the user's arms could be used to interpret certain motions of the user with respect to the tennis game. In order to estimate the orientation of a user's arm, landmarks could be detected from 2D image data of the user. The landmarks could include the shoulder, elbow, wrist, and/or hand of the user. The landmarks could be combined with depth data to make the first estimate, and the landmarks could be used with the second technique to check the first estimate. In another case, the user might be holding an actual tennis racket. In this case, an estimated orientation of the tennis racket could be used to interpret certain user motions relevant to the tennis game.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method performed by a computing device, the method comprising:
   differentiating an object from other portions of an image, the image comprising two-dimensional image data and depth data;
   determining landmarks of the differentiated object;
   determining a first estimate of object orientation of the differentiated object using a first technique that uses the depth data in determining a geometric model of the differentiated object;
   determining a second estimate of the object orientation of the differentiated object using a second technique with the landmarks of the differentiated object;
   correcting the first estimate using the second estimate to generate a corrected object orientation estimate; and
   outputting the corrected object orientation estimate.

2. The method of claim 1, wherein the geometric model includes a plane of the differentiated object.

3. The method of claim 1, wherein the first technique comprises determining the landmarks and an up vector of the differentiated object.

4. The method of claim 1, wherein the first estimate comprises estimates of angles of rotation relative to multiple axes of rotation of the differentiated object.

5. The method of claim 4, wherein the multiple axes of rotation of the differentiated object correspond to pitch, roll, and yaw.

6. The method of claim 4, wherein the second estimate of the object orientation includes another estimate of at least one of the angles of rotation.

7. The method of claim 6, wherein the multiple axes of rotation of the differentiated object correspond to pitch, roll, and yaw and the second estimate corresponds to yaw.

8. The method of claim 1, wherein the landmarks are determined from the two-dimensional image data.

9. The method of claim 1, wherein the depth data includes time-of-flight depth data.

10. The method of claim 1, further comprising assigning a weight to the second estimate according to a distance of the differentiated object from a camera that collects the depth data, wherein the weight is used to generate the corrected object orientation estimate.

11. The method of claim 1, wherein the correcting includes determining an extent to which the first estimate is consistent with the second estimate.

12. The method of claim 1, wherein the differentiated object is a body part of a user, a handheld object, a vehicle, or a computing device.

13. A system, comprising:
a processing device; and
a storage device storing computer-executable instructions which, when executed by the processing device, cause the processing device to:
obtain an image comprising depth data;
differentiate an object from other portions of the image;
determine landmarks of the differentiated object;
determine a first estimate of object orientation of the differentiated object using a first technique that uses the depth data to determine a geometric model of the differentiated object;
determine a second estimate of the object orientation of the differentiated object using a second technique that considers the landmarks of the differentiated object; and
correct the first estimate using the second estimate to generate a corrected object orientation estimate.

14. The system of claim 13, wherein the image further comprises two-dimensional image data and the landmarks are determined from the two-dimensional image data.

15. The system of claim 13, wherein an overall accuracy of the corrected object orientation estimate is greater than a first accuracy of the first estimate or a second accuracy of the second estimate.

16. The system of claim 13, wherein the second technique is an iterative technique.

17. The system of claim 16, wherein the computer-executable instructions further cause the processing device to adjust a number of iterations of the iterative technique according to available computational resources of the system.

18. A computer-executable memory device or storage device storing computer-executable instructions that, when executed by one or more processing devices, cause the one or more processing devices to perform acts comprising:
detecting an object in an image;
determining landmarks of the detected object;
obtaining a first estimate of object orientation of the detected object, the first estimate being provided by a first technique that determines a geometric model of the detected object;
obtaining a second estimate of the object orientation of the detected object, the second estimate being provided by a second technique that considers the landmarks of the detected object;
correcting the first estimate using the second estimate, based at least in part on an extent to which the first estimate is consistent with the second estimate, to generate a corrected object orientation estimate; and
outputting the corrected object orientation estimate.

19. The computer-executable memory device or storage device of claim 18, wherein the detected object is a head of a user.

20. The computer-executable memory device or storage device of claim 19, wherein the geometric model is a facial plane of the head.

21. The computer-executable memory device or storage device of claim 20, wherein the first estimate of the object orientation is a rotation angle estimate determined using the facial plane of the head.

* * * * *